(12) United States Patent
Cook

(10) Patent No.: US 9,736,300 B2
(45) Date of Patent: Aug. 15, 2017

(54) BLOCKING UNSOLICITED CALLS FROM CALLERID-SPOOFING AUTODIALING DEVICES

(71) Applicant: CenturyLink Intellectual Property LLC, Denver, CO (US)

(72) Inventor: Charles Ivan Cook, Louisville, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 14/840,789

(22) Filed: Aug. 31, 2015

(65) Prior Publication Data

US 2015/0373193 A1 Dec. 24, 2015

Related U.S. Application Data

(63) Continuation-in-part of application No. 13/723,789, filed on Dec. 21, 2012, now Pat. No. 9,154,597.
(Continued)

(51) Int. Cl.
*H04M 3/436* (2006.01)
*H04M 3/42* (2006.01)
(Continued)

(52) U.S. Cl.
CPC ........... *H04M 3/436* (2013.01); *H04M 1/663* (2013.01); *H04M 3/42068* (2013.01);
(Continued)

(58) Field of Classification Search
CPC ........ H04M 1/57; H04M 1/575; H04M 1/663; H04M 3/2281; H04M 3/436;
(Continued)

(56) References Cited

U.S. PATENT DOCUMENTS 5,901,214 A * 5/1999 Shaffer ............... H04M 3/4228
379/207.12
5,982,866 A * 11/1999 Kowalski .......... H04M 3/42042
379/114.15
(Continued)

OTHER PUBLICATIONS

Wang et al., Tracking Anonymous Peer-To-Peer VoIP Calls on the Internet, Nov. 7, 2005, Association for Computing Machinery (ACM), 2005 CCS Proceedings of the 12th ACM Conference on Computer and Communications Security, pp. 81-91.*
(Continued)

*Primary Examiner* — Michael Thier
*Assistant Examiner* — Eric Nowlin
(74) *Attorney, Agent, or Firm* — Swanson & Bratschun, L.L.C.

(57) ABSTRACT

Novel tools and techniques for deterring unsolicited calls are described for deterring unsolicited telephone calls that include a service provider searching and determining that the originating telephone number is in a no-call list, and based on this determination, prohibiting the call from terminating (i.e., connecting with the destination telephone number). Penalties may also be imposed against callers (e.g., solicitors) for no-call violations. Various embodiments provide methods and systems that do not depend on the CallerID (which could be spoofed or might be unavailable) in order to identify the offending party of an unsolicited call or text message (i.e., originating entity), and to block the unsolicited call or text message.

31 Claims, 13 Drawing Sheets

Related U.S. Application Data

(60) Provisional application No. 62/191,089, filed on Jul. 10, 2015.

(51) Int. Cl.
| | |
|---|---|
| *H04M 1/57* | (2006.01) |
| *H04M 1/663* | (2006.01) |
| *H04M 15/10* | (2006.01) |
| *H04M 15/00* | (2006.01) |
| *H04M 15/06* | (2006.01) |
| *H04W 4/16* | (2009.01) |
| *H04L 29/06* | (2006.01) |

(52) U.S. Cl.
CPC ........... *H04M 15/06* (2013.01); *H04M 15/10* (2013.01); *H04M 15/41* (2013.01); *H04M 15/58* (2013.01); *H04W 4/16* (2013.01); *H04L 65/1076* (2013.01); *H04L 65/1079* (2013.01); *H04M 1/57* (2013.01)

(58) Field of Classification Search
CPC ......... H04M 3/42042; H04M 3/42059; H04M 3/42068; H04M 3/42365; H04M 3/51; H04M 3/5175; H04M 3/5183; H04M 3/54; H04M 7/0042; H04M 7/0048; H04M 7/006; H04M 7/0078; H04M 7/1295; H04M 15/06; H04M 15/10; H04M 15/41; H04M 15/58; H04M 2203/556; H04M 2203/6027; H04M 3/42102; H04M 3/5158; H04M 3/5232; H04L 65/1076; H04L 65/1079; H04W 4/16

See application file for complete search history.

(56) References Cited

U.S. PATENT DOCUMENTS

| | | | | |
|---|---|---|---|---|
| 5,991,367 | A | 11/1999 | Robuck | |
| 6,154,533 | A * | 11/2000 | Foelker | H04M 3/42 379/201.01 |
| 6,330,317 | B1 | 12/2001 | Garfinkel | |
| 6,353,663 | B1 | 3/2002 | Stevens et al. | |
| 6,356,630 | B1 * | 3/2002 | Cai | H04M 3/387 379/114.15 |
| 6,393,113 | B1 * | 5/2002 | Karras | H04M 3/2218 379/133 |
| 6,519,335 | B1 * | 2/2003 | Bushnell | H04M 1/663 379/208.01 |
| 6,728,355 | B2 * | 4/2004 | Kowalski | H04M 3/42042 379/127.01 |
| 6,839,414 | B1 | 1/2005 | Enzmann et al. | |
| 6,993,119 | B1 * | 1/2006 | Zhang | H04M 3/54 379/88.01 |
| 7,020,259 | B2 | 3/2006 | Hussain et al. | |
| 7,212,620 | B1 | 5/2007 | Mastro | |
| 7,231,029 | B1 | 6/2007 | Kirkpatrick | |
| 7,248,676 | B2 * | 7/2007 | Visser | H04M 3/436 370/356 |
| 7,260,192 | B2 * | 8/2007 | Nolting | H04M 3/2281 379/112.01 |
| 7,295,660 | B1 | 11/2007 | Higginbotham et al. | |
| 7,412,049 | B1 * | 8/2008 | Koch | H04M 3/436 379/195 |
| 7,492,888 | B2 * | 2/2009 | Power | H04M 3/5232 379/265.13 |
| 7,586,902 | B2 * | 9/2009 | Epley | H04L 29/06027 340/539.18 |
| 7,797,379 | B2 | 9/2010 | Hawkins | |
| 7,912,192 | B2 * | 3/2011 | Kealy | H04L 12/585 379/114.14 |
| 7,912,193 | B2 * | 3/2011 | Chingon | H04M 3/42153 379/142.08 |
| 8,085,924 | B2 * | 12/2011 | Shaffer | H04M 3/4228 379/211.02 |
| 8,144,847 | B2 * | 3/2012 | Daly | H04M 3/229 379/114.05 |
| 8,149,823 | B2 * | 4/2012 | Turcan | H04L 29/06 370/262 |
| 8,180,041 | B2 * | 5/2012 | Shaffer | H04M 3/4228 379/219 |
| 8,238,532 | B1 * | 8/2012 | Cox | H04M 15/06 379/114.14 |
| 8,311,204 | B2 * | 11/2012 | Fotta | H04M 3/2281 340/500 |
| 8,363,803 | B2 | 1/2013 | Gupta | |
| 8,488,479 | B2 | 7/2013 | Li et al. | |
| 8,538,000 | B2 * | 9/2013 | Bantukul | G06Q 10/06 379/211.01 |
| 8,634,520 | B1 * | 1/2014 | Morrison | H04M 3/436 370/241 |
| 8,752,174 | B2 * | 6/2014 | Buford | H04L 63/1491 726/13 |
| 9,036,811 | B1 * | 5/2015 | Gudger | H04M 3/38 379/218.02 |
| 9,154,597 | B2 | 10/2015 | Cook | |
| 9,277,049 | B1 * | 3/2016 | Danis | H04M 3/42042 |
| 9,277,431 | B1 * | 3/2016 | Podolsky | H04W 24/08 |
| 9,313,631 | B2 * | 4/2016 | Dudai | H04M 3/42102 |
| 9,344,892 | B1 * | 5/2016 | Rodrigues | H04W 76/02 |
| 9,386,149 | B2 * | 7/2016 | Korn | H04M 3/4365 |
| 9,553,985 | B2 * | 1/2017 | Cohen | H04M 3/4365 |
| 9,584,663 | B2 * | 2/2017 | Czachor, Jr. | H04M 3/5231 |
| 2001/0012345 | A1 * | 8/2001 | Nolting | H04M 3/2281 379/112.01 |
| 2001/0033643 | A1 * | 10/2001 | Mulvey | H04M 1/663 379/196 |
| 2002/0044640 | A1 * | 4/2002 | Meek | H04M 3/436 379/211.01 |
| 2003/0138091 | A1 * | 7/2003 | Meek | H04M 3/436 379/218.01 |
| 2003/0152198 | A1 | 8/2003 | Price | |
| 2004/0131164 | A1 | 7/2004 | Gould | |
| 2004/0198454 | A1 | 10/2004 | Chavez et al. | |
| 2004/0213396 | A1 | 10/2004 | MacNamara et al. | |
| 2004/0264663 | A1 | 12/2004 | Enzmann et al. | |
| 2005/0053215 | A1 | 3/2005 | Bedingfield | |
| 2005/0117714 | A1 * | 6/2005 | Chingon | H04M 3/42153 379/88.12 |
| 2005/0201534 | A1 * | 9/2005 | Ignatin | H04M 1/663 379/88.22 |
| 2005/0226151 | A1 | 10/2005 | Fotta et al. | |
| 2005/0232400 | A1 * | 10/2005 | Visser | H04M 3/436 379/88.19 |
| 2005/0259667 | A1 | 11/2005 | Vinokurov et al. | |
| 2006/0147014 | A1 | 7/2006 | Smith et al. | |
| 2006/0188081 | A1 * | 8/2006 | Hooper | H04M 3/436 379/211.02 |
| 2007/0143422 | A1 | 6/2007 | Cai | |
| 2008/0146200 | A1 * | 6/2008 | Martin | H04M 3/436 455/413 |
| 2008/0181379 | A1 * | 7/2008 | Chow | H04L 63/0823 379/142.05 |
| 2008/0198987 | A1 * | 8/2008 | Daly | H04M 3/229 379/114.05 |
| 2009/0074163 | A1 * | 3/2009 | Shaffer | H04M 3/4228 379/142.05 |
| 2009/0097630 | A1 * | 4/2009 | Fotta | H04M 3/436 379/210.02 |
| 2010/0091966 | A1 * | 4/2010 | Cohen | H04M 3/42042 379/142.06 |
| 2010/0149981 | A1 | 6/2010 | Kimble et al. | |
| 2010/0323675 | A1 | 12/2010 | Hawkins | |
| 2011/0294478 | A1 | 12/2011 | Trivi et al. | |
| 2012/0015639 | A1 | 1/2012 | Trivi et al. | |
| 2012/0027191 | A1 | 2/2012 | Baril et al. | |
| 2012/0128144 | A1 | 5/2012 | Chislett et al. | |
| 2012/0309365 | A1 | 12/2012 | Wang et al. | |
| 2013/0022187 | A1 | 1/2013 | Velusamy | |
| 2014/0105373 | A1 | 4/2014 | Sharpe | |

(56) References Cited

U.S. PATENT DOCUMENTS

| | | | |
|---|---|---|---|
| 2014/0119527 A1* | 5/2014 | Cohen | H04M 3/4365 379/207.13 |
| 2014/0177479 A1 | 6/2014 | Cook | |
| 2014/0185786 A1* | 7/2014 | Korn | H04M 3/4365 379/210.02 |
| 2015/0181397 A1* | 6/2015 | Dudai | H04M 3/42102 455/405 |
| 2016/0036991 A1* | 2/2016 | Brewer | H04L 65/1076 370/356 |
| 2016/0234389 A1* | 8/2016 | Czachor, Jr. | H04M 3/5231 |
| 2016/0316057 A1* | 10/2016 | Korn | H04M 3/4365 |
| 2017/0048388 A1* | 2/2017 | Sharpe | H04M 3/436 |

OTHER PUBLICATIONS

U.S. Appl. No. 13/723,789; Non-Final Rejection dated May 16, 2014; 63 pages.

U.S. Appl. No. 13/723,789; Final Rejection dated Sep. 10, 2014; 37 pages.

U.S. Appl. No. 13/723,789; Non-Final Rejection dated Jan. 28, 2015; 42 pages.

U.S. Appl. No. 13/723,789; Notice of Allowance dated Jun. 5, 2015; 38 pages.

U.S. Appl. No. 13/723,789; Issue Notification dated Sep. 16, 2015; 1 page.

\* cited by examiner

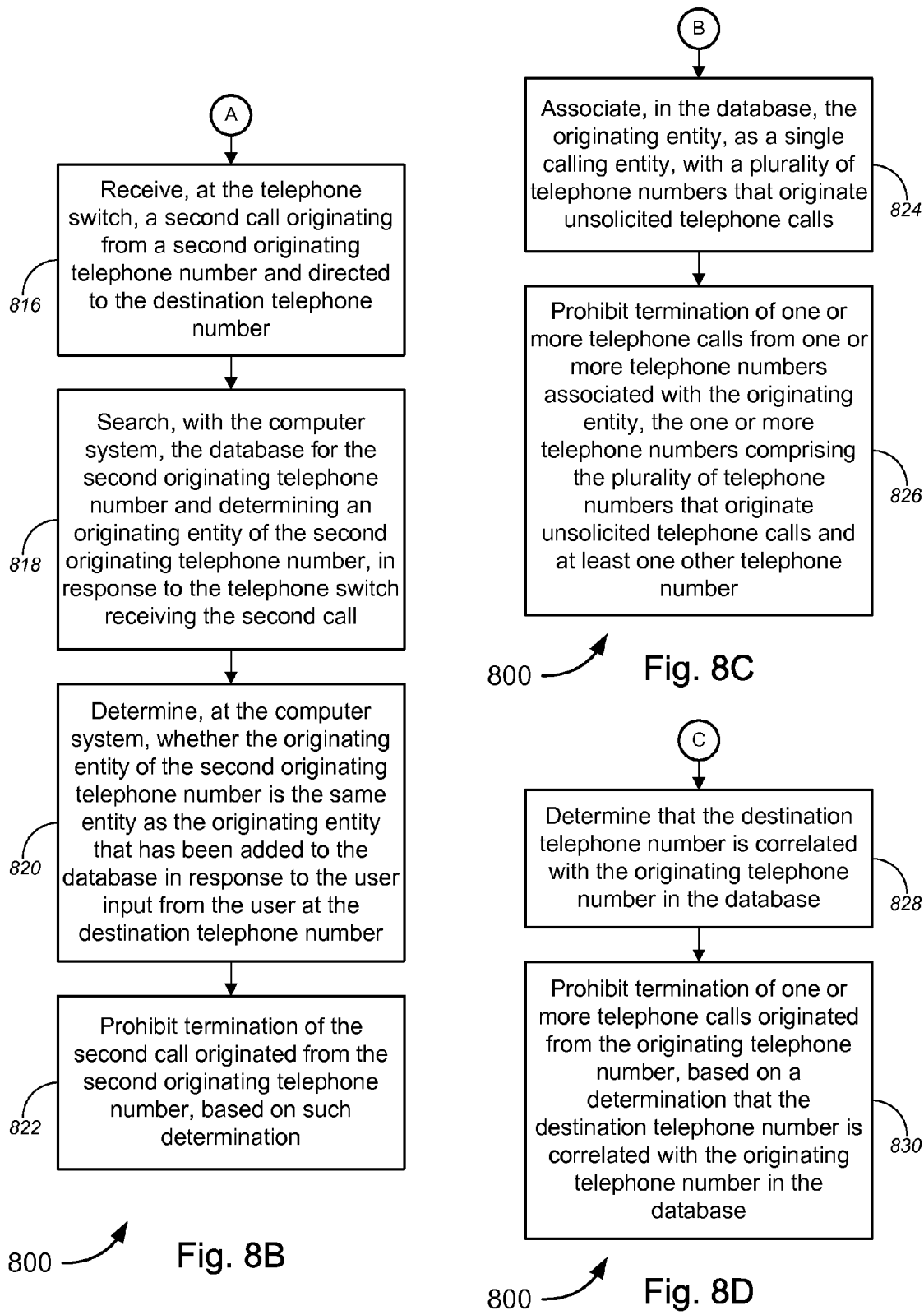

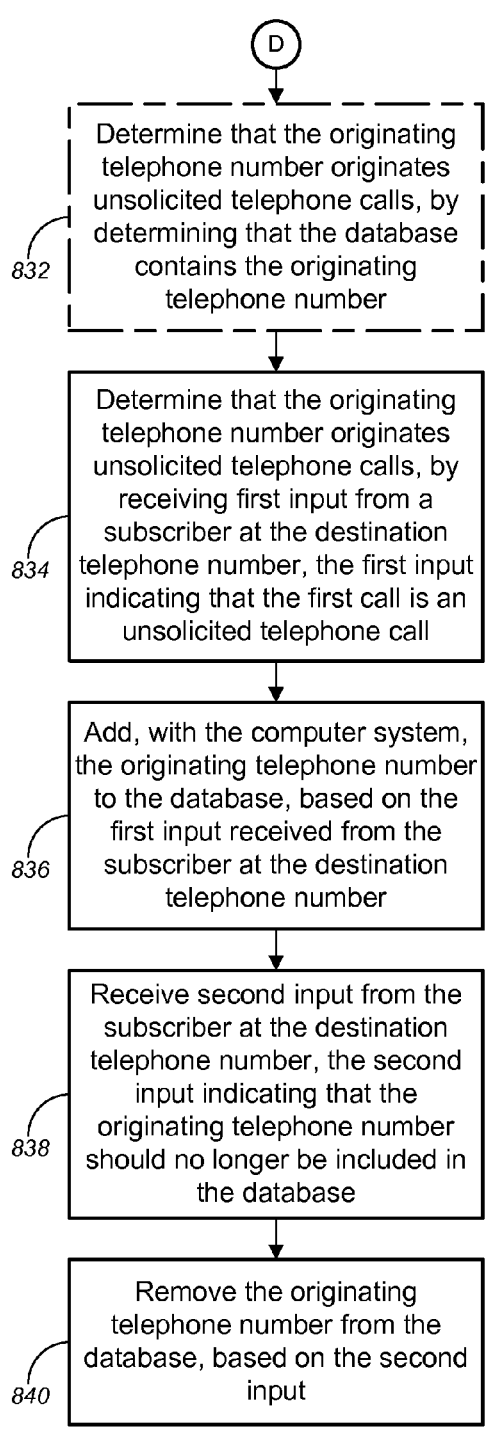
Fig. 8E
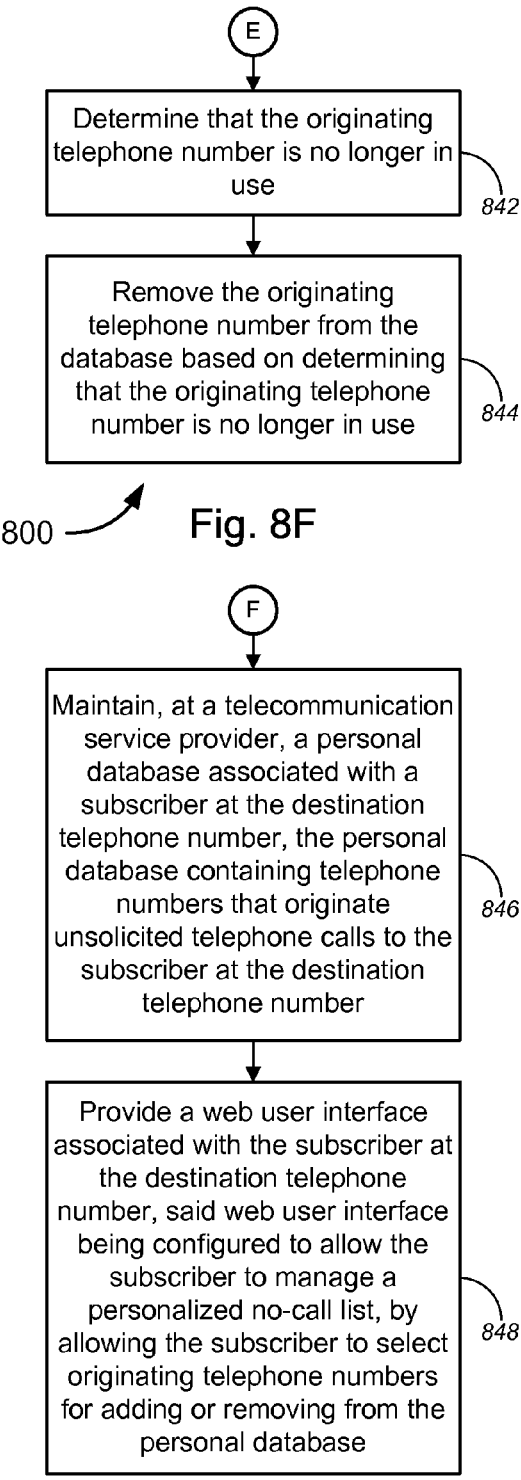
Fig. 8F
Fig. 8G

BLOCKING UNSOLICITED CALLS FROM CALLERID-SPOOFING AUTODIALING DEVICES

CROSS-REFERENCE TO RELATED APPLICATIONS

This application claims priority to U.S. Patent Application Ser. No. 62/191,089 (the "'089 application"), filed Jul. 10, 2015 by Charles Ivan Cook, entitled, "Blocking Unsolicited Calls from CallerID-Spoofing Autodialing Devices."

This application is also a continuation-in-part of U.S. patent application Ser. No. 13/723,789 (the "'789 application"), filed Dec. 21, 2012 by Charles Ivan Cook, entitled, "No Call List Deterrent."

The entire disclosure of each of these applications is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to tools and techniques for deterring or blocking unsolicited telephone calls.

BACKGROUND

For an average person, receiving an unsolicited call can be an annoyance and a frustration, especially if the recipient of the unsolicited call had previously indicated to the caller that he or she does not wish to receive future calls from the caller and/or if the recipient had previously put the telephone number of the unsolicited caller on a no-call list.

Currently, existing methods for protecting the average person against such unsolicited calls include call screening, anonymous call blocking, and caller compliance with a national "Do Not Call" list. However, such methods do not deter persistent unsolicited callers. Such callers can simply ignore Do Not Call lists, use a bank of phones having different telephone numbers from which to make unsolicited calls, employ non-anonymous caller ID names, and/or target other average people, who might not utilize any of these protective methods.

In addition, although national no-call lists are used, such lists are common to everyone within the nation. There do not appear to be any service providers that presently offer a subscriber a personal no-call list that allows the subscriber to add, remove, or otherwise modify/manage his or her personal no-call list, which is separate from the national no-call lists.

In some cases, autodialers or robocallers might be used to initiate such unsolicited calls (which might include voice calls or text messages, or both) in an automated manner (either sequentially and/or in a random fashion). In some instances, originating telephone numbers, as identified by CallerID systems at the destination telephone, are spoofed or unavailable, making identification of the actual originating offending party difficult or impossible for the user. In some cases, innocent third parties, whose telephone numbers have been spoofed by the offending party, might be needlessly punished.

The embodiments disclosed herein are directed toward overcoming one or more of the problems discussed above.

BRIEF SUMMARY

Various embodiments provide techniques to deter or block unsolicited telephone calls. In some embodiments, deterring unsolicited telephone calls includes searching and determining that the originating telephone number is in a no-call list or no-call-list database, and based on this determination, such embodiments prohibit the call from terminating (i.e., connecting with the destination telephone number). In some cases, the determination is made by referring to a database that stores information about calling numbers that originate unsolicited calls. In an aspect of some embodiments, a particular calling number can be correlated in the database with one or more subscriber numbers of subscribers that have indicated that they do not wish to receive calls from that calling number. Likewise, a given subscriber number might have correlated therewith a plurality of originating numbers from whom the subscriber does not want to receive unsolicited calls.

According to some embodiments, deterring unsolicited telephone calls includes imposing penalties for no-call violators (e.g., solicitors). In some embodiments, penalties that may be imposed include generating a call detail record ("CDR") and statistics of no-call list violations by the caller. Generating a CDR and statistics may include a determination or compilation of all telephone numbers associated with the caller, and determining whether at least one of these telephone numbers originates unsolicited calls. Either a service provider that sets up the call path (and/or that determines whether or not to terminate a call) or a third party service provider (e.g., a clearinghouse) could perform the generation of the CDR and statistics of no-call list violations.

Particular embodiments can enable the automatic regulation and maintenance of offensive no-call violations. Since there are devices that spoof CallerID, such embodiments can employ a mechanism that does not require the delivery of CallerID.

In accordance with some embodiments, the caller or solicitor might be billed or charged with the unsolicited calls based at least in part on the information gathered in the CDR and the statistics of no-call list violations. In some embodiments, the victims of the no-call list violations (e.g., recipients or subscribers who are actually connected with the solicitor) may be credited, in part or in full, using any payments provided by the caller to the service provider in order to satisfy or pay the bills. In some embodiments, in the case that the caller is a subscriber of the service provider, the caller may be disconnected from service based on a determination that the caller originates unsolicited calls. Such disconnection may be for a preset period (e.g., for a period of a few months of a few years) or may be permanent.

Some embodiments might be configured to notify authorities (e.g., law enforcement or regulatory agencies) of no-call list violations by the caller, such as in the form of petitions or complaints, which may include a request that action be taken (e.g., fining the solicitor and/or seeking injunctions against the solicitor from a State or Federal court). In some embodiments, the CDR and statistics of no-call list violations may be sent to the authorities, together with the petition or complaint.

With reference to various embodiments, a technique might be provided to enable removal of the telephone number from a no-call list or no-call-list database. Merely by way of example, for a personal no-call list, a subscriber may be provided with the ability or capabilities to add, remove, or otherwise manage his or her personal no-call list. For other no-call lists, the service provider may periodically follow a procedure to determine whether the telephone number was added to the list due to unauthorized use (or perhaps due to error), whether the telephone number is no longer in use, whether the telephone number is now associated with another person or entity, and whether the telephone number is a residential telephone number (as well as how long the residential telephone number has been on the no-call list). Based on these determinations, the telephone number may be removed from the no-call list or no-call-list database.

Various embodiments provide a mechanism that does not depend on the CallerID (which could be spoofed or might be unavailable) in order to identify the offending party of an unsolicited call or text message (i.e., originating entity), and provides a mechanism to block the unsolicited call or text message.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a method might be provided for deterring unsolicited telephone calls. The method might comprise, in response to user input received by a telephone switch from a telephone at a destination telephone number during a first call from an originating telephone number and terminated to the destination telephone number by the telephone switch, capturing, with a computer system, call processing data associated with the first call. The method might further comprise identifying, with the computer system and based at least in part on the call processing data, an originating entity of the first call, and adding, with the computer system, information about the originating entity to a database of telephone numbers that originate unsolicited telephone calls.

In some embodiments, the telephone switch might comprise the computer system. In some cases, the telephone switch might comprise a class 5 wireline switch. In some instances, the telephone switch might comprise a voice over Internet Protocol ("VoIP") softswitch. In some cases, the telephone switch might comprise a mobile switching center ("MSC"). According to some embodiments, the first call might be one of a telemarketing voice call or a telemarketing text message. Alternatively, the first call might be one of a prank telephone call or a prank text message.

Merely by way of example, in some instances, the method might further comprise receiving, at the telephone switch, a second call originating from a second originating telephone number and directed to the destination telephone number, and searching, with the computer system, the database for the second originating telephone number and determining an originating entity of the second originating telephone number, in response to the telephone switch receiving the second call. The method might also comprise determining, at the computer system, whether the originating entity of the second originating telephone number is the same entity as the originating entity that has been added to the database in response to the user input from the user at the destination telephone number. The method might further comprise prohibiting termination of the second call originated from the second originating telephone number, based on a determination that the originating entity of the second originating telephone number is the same originating entity that has been added to the database in response to the user input from the user at the destination telephone number.

In some cases, the method might further comprise associating, in the database, the originating entity, as a single calling entity, with a plurality of telephone numbers that originate unsolicited telephone calls. The method might further comprise prohibiting termination of one or more telephone calls from one or more telephone numbers associated with the originating entity, the one or more telephone numbers comprising the plurality of telephone numbers that originate unsolicited telephone calls and at least one other telephone number.

According to some embodiments, the method might further comprise determining that the originating telephone number originates unsolicited telephone calls, by determining that the database contains the originating telephone number. Alternatively, the method might further comprise determining that the originating telephone number originates unsolicited telephone calls, by receiving first input from a subscriber at the destination telephone number, the first input indicating that the first call is an unsolicited telephone call. The method might also comprise adding, with the computer system, information about the originating entity to the database comprises adding the originating telephone number to the database, based on the first input received from the subscriber at the destination telephone number. In some cases, the method might further comprise receiving second input from the subscriber at the destination telephone number, the second input indicating that the originating telephone number should no longer be included in the database, and removing the originating telephone number from the database, based on the second input received from the subscriber at the destination telephone number.

In some embodiments, the method might further comprise maintaining, at a telecommunication service provider, a personal database associated with a subscriber at the destination telephone number, the personal database containing telephone numbers that originate unsolicited telephone calls to the subscriber at the destination telephone number. The method might additionally comprise providing a web user interface associated with the subscriber at the destination telephone number, said web user interface being configured to allow the subscriber to manage a personalized no-call list, by allowing the subscriber to select originating telephone numbers for adding or removing from the personal database.

In some instances, the database might further contain a plurality of subscriber telephone numbers, the plurality of subscriber telephone numbers comprising the destination telephone number. The database might correlate a first telephone number that originates unsolicited telephone calls with one or more subscriber telephone numbers associated with subscribers that do not wish to receive telephone calls from the first telephone number that originates unsolicited telephone calls. In some cases, the method might further comprise determining that the destination telephone number is correlated with the originating telephone number in the database and prohibiting termination of one or more telephone calls originated from the originating telephone number, based on a determination that the destination telephone number is correlated with the originating telephone number in the database.

Merely by way of example, in some embodiments, the method might further comprise determining that the originating telephone number is no longer in use and removing the originating telephone number from the database based on determining that the originating telephone number is no longer in use.

In some cases, the method might further comprise playing, through the telephone switch, an audible warning to the originating telephone number on the call, the audible warning indicating that further calls will violate unsolicited calling restrictions. In some embodiments, the method might further comprise determining, at the computer system, that the originating entity associated with the originating telephone number has been warned previously about unsolicited telephone calls and imposing a penalty on the originating entity in response to determining that the originating entity has been warned previously and continues to originate unsolicited telephone calls. In some cases, imposing a penalty might comprise informing an authority about the originated unsolicited telephone calls from the originating entity. Alternatively, or additionally, imposing a penalty might comprise generating a call detail record to bill one or more of the unsolicited telephone calls to the originating entity.

According to some embodiments, the call processing data might comprise information from a call detail record ("CDR"). In some instances, identifying the originating entity of the first call might comprise correlating the call processing data with switch data to identify the originating entity. In some cases, the user input might comprise one or more DTMF tones received by the telephone switch from the telephone at the destination telephone number during the first call. In various embodiments, a CallerID field of the first call might be spoofed or unavailable. In some embodiments, the information about the originating entity might comprise one or more telephone numbers associated with the originating entity. In some instances, the one or more telephone numbers comprises the originating telephone number.

In some embodiments, the method might comprise maintaining the database of telephone numbers that originate unsolicited telephone calls, receiving, at the telephone switch, the first call originating from the originating telephone number and directed to the destination telephone number, terminating the first call to the destination telephone number, and receiving, at the telephone switch, user input from the user at the destination telephone number.

In another aspect, an apparatus might comprise a non-transitory computer readable medium having encoded thereon a set of instructions executable by one or more computers to cause the one or more computers to: in response to user input received by a telephone switch from a telephone at a destination telephone number during a first call from an originating telephone number and terminated to the destination telephone number by the telephone switch, capture call processing data associated with the first call; identify, based at least in part on the call processing data, an originating entity of the first call; and add information about the originating entity to a database of telephone numbers that originate unsolicited telephone calls.

According to some embodiments, the set of instructions, executable by the one or more computers, might further cause the apparatus to: in response to receiving, at the telephone switch, a second call originating from a second originating telephone number and directed to the destination telephone number, search the database for the second originating telephone number and determine an originating entity of the second originating telephone number; determine whether the originating entity of the second originating telephone number is the same entity as the originating entity that has been added to the database in response to the user input from the user at the destination telephone number; and prohibit termination of the second call originated from the second originating telephone number, based on a determination that the originating entity of the second originating telephone number is the same originating entity that has been added to the database in response to the user input from the user at the destination telephone number.

In yet another aspect, a system might comprise a database of telephone numbers that originate unsolicited telephone calls, a telephone switch configured to receive a first call originating from an originating telephone number and directed to a destination telephone number, and configured to terminate the first call to the destination telephone number, and a computer system in communication with the database and the telephone switch. The computer system might comprise one or more processors and a computer readable medium in communication with the one or more processors. The computer readable medium might have encoded thereon a set of instructions executable by the computer system to: in response to user input received by the telephone switch from a telephone at the destination telephone number during the first call, capture call processing data associated with the first call; identify, based at least in part on the call processing data, an originating entity of the first call; and add information about the originating entity to the database.

In some embodiments, the set of instructions, executable by the one or more processors, might further cause the computer system to: in response to receiving, at the telephone switch, a second call originating from a second originating telephone number and directed to the destination telephone number, search the database for the second originating telephone number and determine an originating entity of the second originating telephone number; determine whether the originating entity of the second originating telephone number is the same entity as the originating entity that has been added to the database in response to the user input from the user at the destination telephone number; and prohibit termination of the second call originated from the second originating telephone number, based on a determination that the originating entity of the second originating telephone number is the same originating entity that has been added to the database in response to the user input from the user at the destination telephone number.

One set of embodiments provides methods for deterring unsolicited telephone calls. An exemplary method might comprise maintaining, at a telecommunication service provider, a database of telephone numbers that originate unsolicited telephone calls, and receiving, at a telephone switch operated by the telecommunication service provider, a first call originating from an originating telephone number and directed to a destination telephone number. The method might further comprise searching, with a computer system, the database for the originating telephone number, and determining, at the computer system, that the originating telephone number originates unsolicited telephone calls. Based at least in part on determining that the originating telephone number originates unsolicited telephone calls, the method, in an aspect of some embodiments, could further comprise prohibiting termination (i.e., preventing connection) of one or more telephone calls originated from the originating telephone number.

Another set of embodiments provides apparatuses for deterring unsolicited telephone calls. An exemplary apparatus might comprise a computer readable medium having encoded thereon a set of instructions executable by one or more computers to perform one or more operations, including without limitation operations provided by methods of various embodiments. Merely by way of example, the set of instructions could comprise instructions for maintaining a database of telephone numbers that originate unsolicited telephone calls. The set of instructions might further comprise instructions for searching, with a computer system, the database for an originating telephone number, upon receiving, at a telephone switch operated by the telecommunication service provider, a first call originating from the originating telephone number and directed to a destination telephone number. In some embodiments, the set of instructions further comprises instructions for determining that the originating telephone number originates unsolicited telephone calls, and/or instructions for prohibiting termination of one or more telephone calls originated from the originating telephone number, e.g., based at least in part on determining that the originating telephone number originates unsolicited telephone calls.

Yet another set of embodiments provides systems for deterring unsolicited telephone calls. An exemplary system might comprise a database of telephone numbers that originate unsolicited telephone calls, a telephone switch configured to receive a first call originating from an originating telephone number and directed to a destination telephone number, and/or a computer system, which could be in communication with the database and the telephone switch. An exemplary computer system could comprise one or more processors, and a computer readable medium in communication with the one or more processors, the computer readable medium having encoded thereon a set of instructions executable by the computer system to perform one or more operations, including without limitation operations provided by methods of various embodiments. For instance, in one embodiment, the set of instructions might comprise instructions for searching the database for the originating telephone number, and/or instructions for determining that the originating telephone number originates unsolicited telephone calls. In some embodiments, the set of instructions further comprises instructions for prohibiting termination of one or more telephone calls originated from the originating telephone number, based at least in part on determining that the originating telephone number originates unsolicited telephone calls.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 8A-8H are flow diagrams illustrating a method for blocking unsolicited calls from callerID-spoofing autodialing devices or the like, in accordance with various embodiments.

DETAILED DESCRIPTION OF CERTAIN EMBODIMENTS

Figure 1:
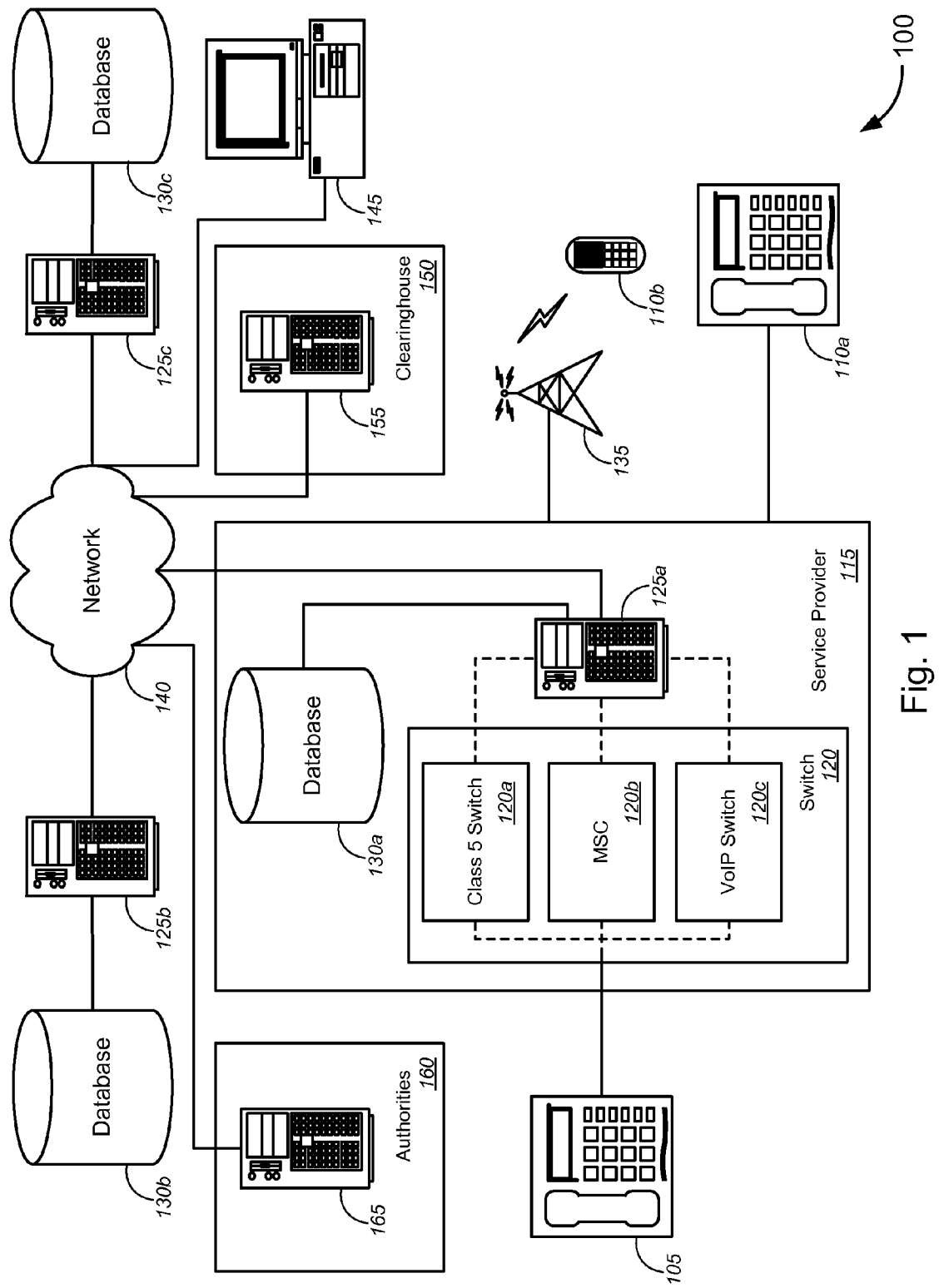
FIG. 1 is a system diagram illustrating a system for deterring or blocking unsolicited calls, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As is well understood in the art, the term, "termination of a call" or similar phrasing (e.g., "terminating a call," etc.), means connecting a call between a caller and a recipient. Conversely, "prohibiting termination of a call" or similar phrasing (e.g., "preventing a call from terminating," etc.) means preventing the connection of a call between a caller and a recipient and/or refusing to connect the call (e.g., by the telephone switch rejecting the call). Hereinafter, unless otherwise specified, "no-call list" refers to either a personal no-call list, a regional no-call list, a national no-call list, and/or a global/international no-call list. Accordingly, unless otherwise specified, "no-call-list database" refers to either a personal no-call-list database, a regional no-call-list database, a national no-call-list database, and/or a global/international no-call-list database. Hereinafter, unless otherwise indicated, the "subscriber" refers to the intended recipient of the call originated by the originating telephone (which, e.g., may be associated with the "caller"). In other words, the subscriber is a person who is associated with the destination telephone number and/or the destination telephone(s); either the person and/or the destination telephone number may be associated with the service provider.

In addition, for the purposes of this document, the terms, "originating telephone" and "originating telephone number" (which is associated with the "originating telephone") should be considered interchangeable unless the context dictates otherwise. Likewise, the terms "destination telephone" and "destination telephone number" (which is associated with the "destination telephone") can be considered interchangeable unless the context dictates otherwise. Hereinafter, the terms, "no-call list" and "no-call-list database," can refer either to the contents of a no-call list (e.g., originating numbers and/or correlated subscriber numbers) or to a database in which the list is stored, depending on context.

With reference to the figures, FIG. 1 is a system diagram illustrating an exemplary system 100 for deterring or blocking unsolicited calls, in accordance with various embodiments. The skilled reader should note that the illustrated system 100 includes many components that can be considered alternatives and/or can be used in conjunction with one another, in various embodiments. Hence, the description herein of the illustrated system 100 is provided for purpose of illustration and should not be considered to limit the scope of different embodiments.

In system 100 as shown in FIG. 1, a caller uses originating telephone 105 having (or associated with) an originating telephone number to direct a call to a recipient at a destination telephone 110 having (or associated with) a destination telephone number. The destination telephone 110 may include telephone set 110a (including, but not limited to, a land-line telephone or an Internet Protocol telephone ("IP phone"), etc.) and/or a mobile device 110b having telephonic functionality (including, but not limited to, a cellular phone; a smart phone; a personal digital assistant ("PDA") having voice over internet protocol ("VoIP") functionality; and a laptop computer, tablet computer, or other computer having VoIP functionality, etc.). In some embodiments, if it is determined that the caller is not an unsolicited caller (such as a telemarketer, prank caller, stalker, etc.), the call will be terminated (connected) to destination telephone set 110a at least in part by a land-line connection or connected to destination mobile device 110b at least in part via tower 135. This termination can be accomplished in conventional fashion.

The call from the originating telephone 105 is handled through a telecommunications service provider 115 having a telephone switch 120. Switch 120 may comprise a class 5 wireline switch 120a, a mobile switching center ("MSC") 120b, and/or a VoIP softswitch 120c, to name a few examples, each of which may perform the function of switching the call path to an appropriate call path that connects the originating telephone 105 to the destination telephone 110 or to an appropriate call path that prohibits termination of the call (i.e., to prevent connection of the call).

While switch 120 is shown, for ease of illustration, as incorporating three different types of switches 120a-c, one skilled in the art will appreciate that such switches need not, and often are not, collocated as depicted. Moreover, the different types of switches 120a-c are provided as examples, and various embodiments might provide each type of switch at different locations in the network topology (as known in the art), and/or the different types of switches 120a-c can be considered alternatives. Hence, the functionality of the system 100 is independent of the type of switch selected, and the switch 120 is intended to refer generically to a telephone switch that might be one of the illustrated types or might be a different type of switch.

The switch 120 may further include (and/or be in communication with) a computer system 125 operated by the service provider for determining routing of the call path and/or determining whether an originating telephone number is in a no-call list, which can be stored in the no-call list database 130. In some embodiments, the computer system 125 and database 130 may be collocated with the switch 120 and/or operated by the service provider 115. In other embodiments, the computer system 125 and database 130 may be located external to the service provider 115 and/or distant from the switch 120. The location of the computer system 125 and/or the relative integration of the computer system 125 with the switch 120 can vary in different embodiments. The no-call list may include one or more of a personal no-call list, a regional no-call list, a national no-call list, and/or a global/international no-call list.

Referring again to FIG. 1, various embodiments of the system 100 can include one or more computer systems 125, including without limitation a local computer system 125a, a remote computer system 125b, and/or a subscriber-based computer system 125c. Any of these computer systems 125 can, individually and/or collectively, perform the operations ascribed herein to a computer system. By way of example, the local computer system 125a is local to (or collocated with) the switch 120, and in some aspects, may be embodied in the switch 120. One or more of the computer systems 125 are in communication with at least one no-call-list database 130, which can include one or more local no-call-list databases 130a, remote no-call-list databases 130b, and/or subscriber-based no-call-list databases 130*c*. A subscriber-based computer system 125*c* and/or a subscriber-based no-call-list database 130*c* may be configured to serve all, or a subset, of the service provider's subscribers. In some embodiments, the subscriber-based computer system 125*c* and the subscriber-based no-call-list database 130*c* may be embodied in a plurality of computer systems 125*c* and a plurality of databases 130*c*, and the plurality of computer systems 125*c* and the plurality of databases 130*c* may be located, e.g., in a central location—such as a central office, data center, etc.—or in multiple locations throughout the region, in multiple locations throughout the nation, or in multiple locations throughout the world. As such, the network 140 may be the Internet, a public switched telephone network ("PSTN"), a private network, an Intranet, a local area network ("LAN"), a wide area network ("WAN"), and/or the like.

According to some embodiments, when a caller makes a call from originating telephone 105 directed at a recipient at destination telephone 110, the call is received at switch 120 of telecommunications service provider 115, which notifies the computer system 125 of the received call (e.g., using a termination attempt trigger ("TAT") in a SS7 network). Computer system 125 (which could be a service control point ("SCP"), intelligent peripheral ("IP"), or any other device appropriate to the provider network and capable of functioning as described herein) searches a no-call-list database 130 for the originating telephone number. If the originating telephone number is found during a search of no-call-list database 130, the computer system 125 determines that the originating telephone number originates unsolicited telephone calls. Based at least in part on this determination (i.e., that the originating telephone number originates unsolicited telephone calls), the computer system 125 causes the switch 120 to prohibit termination of the call (i.e., prevent connection of the call) originated from the originating telephone 105 (or the originating telephone number associated therewith), by sending instructions to the switch 120 to not terminate (i.e., not connect) the call to the destination telephone 110 (or destination telephone number associated therewith). In some embodiments, the computer system 125 may cause the switch 120 to prohibit termination (i.e., connection) of more than one call (e.g., any and all future calls, including the present call) that originates from the originating telephone number.

According to some embodiments, the computer system 125 may be a local computer system 125*a*, which is local to (or located at) the telecommunications service provider 115, and may even be collocated with switch 120 of the telecommunications service provider 115. The local computer system 125*a* receives the call from the originating telephone 105, and searches local no-call-list database 130*a* for the originating telephone number. If the originating telephone number is on the local no-call-list stored in local database 130*a*, then the local computer system 125*a* determines that the originating telephone number (or the caller associated with the originating telephone number) originates unsolicited calls, and subsequently causes the switch 120 to prohibit termination of the call with the destination telephone 110.

In some embodiments, after receiving the call, local computer system 125*a* may query, and search for the originating telephone number in, a remote no-call-list database 130*b* (e.g., a regional no-call-list database, a national no-call-list database, or a global/international no-call-list database) via network 140, either directly or via remote computer system 125*b*. If the originating telephone number is on the remote no-call-list stored in remote database 130*b*, then the local computer system 125*a* and/or the remote computer system 125*b* determines that the originating telephone number (or the caller associated with the originating telephone number) originates unsolicited calls, and causes the switch 120 to prohibit termination of the call with the destination telephone 110 at the destination telephone number.

In some embodiments, after receiving the call, local computer system 125*a* may query, and search for the originating telephone number in, a (service provider's) subscriber's personal no-call-list stored in a subscriber-based database 130*c* via network 140, either directly or via subscriber-based computer system 125*c*. If the originating telephone number is found (or otherwise determined to be) on the subscriber's personal no-call-list stored in the subscriber-based no-call-list database 130*c*, then the local computer system 125*a* and/or the subscriber-based computer system 125*c* determines that the originating telephone number (or the caller associated with the originating telephone number) originates unsolicited calls, and causes the switch 120 to prohibit termination of the call with the destination telephone 110 at the destination telephone number. In some embodiments, the search for the originating telephone number may be performed in not only the subscriber's no-call list, but also in each of the personal no-call lists (which are associated with a plurality of the subscribers) that are stored in subscriber-based no-call-list database 130*c*. If subscriber-based no-call-list database 130*c* is embodied in a plurality of databases 130*c*, the search may be performed in one or more of the plurality of databases 130*c*.

According to some embodiments, local computer system 125*a* may query, and search for the originating telephone number in at least two databases (e.g., one or more of each of the local no-call-list databases 130*a*, the remote no-call-list databases 130*b*, and/or the subscriber-based no-call-list databases 130*c*). In the case of the subscriber-based no-call-list database 130*c* being searched, the search can be performed either in the subscriber's or call recipient's personal no-call-list or in the personal no-call-lists of all, or a subset, of the service provider's 115 subscribers.

In some embodiments, a subscriber may be provided with an ability to update his or her personal no-call list, stored on subscriber-based no-call-list database 130*c*, by accessing subscriber-based computer system 125*c* and/or database 130*c* using computer 145 (which may include a laptop, a personal computer, and a mobile device (including a mobile telephone, a smart phone, a PDA, a tablet computer, etc.), etc.) via network 140 (including the Internet, a WAN, a PAN, etc.). Alternatively, updating the subscriber's personal no-call list may be done via a phone call to a representative at the service provider 115. Detailed description of an embodiment of the method of updating the subscriber's personal no-call list, as well as an exemplary illustration of a user interface for doing so, is provided below with reference to FIGS. 4 and 5. (It should be noted, of course, that the described no-call list databases are exemplary in nature, and that the features of two or more of the described databases 130 could be combined, so that, for example, a local no-call list database 130*b* might have lists of originating numbers correlated with subscriber numbers, such that the local no-call list is universal for at least a subset of subscribers but also provides for by-subscriber customization of which originating numbers should be blocked.)

According to some embodiments, computer system 125 may be configured to—based on a call detail record (CDR), which may be generated whenever there is a call—correlate and identify all telephone numbers associated with a particular caller or solicitor. Based at least in part on this correlation and identification, and/or based at least in part on a determination that at least one of these telephone numbers originates unsolicited telephone calls (e.g., because the at least one of these telephone numbers is found during a search of a no-call-list database 130), the computer system 125 may be further configured to cause the switch 120 (e.g., by sending instructions to switch 120) to prohibit termination (i.e., connection) of any calls originated from any of the plurality of telephone numbers associated with the particular caller or solicitor. According to some embodiments, the function of correlating and identifying telephone numbers associated with a particular caller or solicitor may be performed by a server 155 at a third party service provider 150, including, but not limited to, a clearinghouse 150. In such cases, the computer system 125 may be configured to send any CDRs to the clearinghouse 150 (or the server 155 associated therewith).

In accordance with some embodiments, the computer system 125 may be configured to determine whether a caller is a serial violator of a no-call list (i.e., a caller or solicitor whose telephone number(s) is in a no-call list, but continues to originate unsolicited calls despite knowing that said telephone number(s) is in the no-call list; e.g., a solicitor, a telemarketer, a prank caller, or a stalker). Detailed description regarding how such a determination may be made is provided below with reference to FIGS. 2A-2B. Upon determining that a caller is a serial violator of a no-call list, the computer system 125 may be further configured to send various warnings to the no-call list violator. The various warnings may, for example, by audible warnings that are played (through the switch 120) to the originating telephone 105 or originating telephone number on the call. In some embodiments, the various warnings may escalate in the level of warnings depending on the number of warnings previously given. For example, the first warning may be a simple warning not to call that particular subscriber number (and/or any telephone numbers on the no-call-list) again and/or a warning indicating that further calls will violate unsolicited calling restrictions. A second warning or a set of second warnings may include warnings that future no-call list violations may result in penalties being imposed (e.g., the service provider billing the solicitor for unsolicited calls, the service provider disconnecting telephone service to the solicitor (if the solicitor is a subscriber of the service provider), and/or the service provider notifying authorities 160 of the no-call violations by the solicitor, etc.). If the second warning or set of second warnings are not heeded, and the caller continues to make unsolicited telephone calls, a CDR (and/or other notification) may be generated and sent to the authorities 160 (e.g., law enforcement authorities, a regulatory commission, or some other government-type agency, etc.), either directly to a server 165 at an authority 160, via e-mail, via postal mail, etc., perhaps together with a request that the authorities 160 take action against the solicitor (e.g., by imposing fines, by seeking court injunctions, etc.).

Unsolicited calls are sometimes generated by use of an autodialing device or robocalling device. These calls can either be voice calls or texts. Some autodialing or robocalling devices intentionally spoof the CallerID information thus misleading the person receiving the call regarding the originator of the call. The result is a nuisance call that is difficult for the called party to identify for the purpose of reporting to a no-call-list violation bureau.

Accordingly, in some embodiments, when an unsolicited call is received, the receiving party can enter a code similar to a "*" or "#" code, or the like, that signals the network to capture the contents of the call detail record ("CDR") or other appropriate call processing data. This information can include, without limitation, some or all of the following information: information on where the call originated, time of day, date, call duration, billing rate, etc. This information can be correlated with switch information to confirm the origin of the call (such as information from an originating switch in communication with the unsolicited caller). Such embodiments can then automatically report the offending call to a no-call-list bureau as a violation. The Service Provider can retain a copy of the information in a database and use the database to block all calls from the originator to any telephone numbers that have been registered on the no-call list. Essentially, when a call is dialed, the information on the originating location is forwarded to a database. The database can check to see if the destination party has requested that a call from that particular origin be blocked. If the originator or originating number is on the blocked call list of the destination party, the call is blocked. When a call is blocked, it is also reported as an attempted no-call-list violation. The Service Provider optionally plays a message to the originating party, optionally applies penalty actions, or both.

Other techniques involving advanced intelligent network ("AIN") could also be used to implement such embodiments. For example, various triggers can be enabled on an AIN service switching point ("SSP"), which can then obtain instructions from a service control point ("SCP") or (or an associated device, such as an intelligent peripheral) to implement the functionality described herein (see, for example, FIG. 8 and description thereof).

FIGS. 2-8 illustrate various methods and techniques that can be used to deter or block unsolicited telephone calls. While the methods and techniques of FIGS. 2-8 are illustrated, for ease of description, as different methods, it should be appreciated that the various techniques and procedures of these methods can be combined in any suitable fashion, and that, in some embodiments, the methods and techniques depicted by FIGS. 2-8 can be considered interoperable and/or as portions of a single method. Moreover, while the methods and techniques illustrated by FIGS. 2-8 can be implemented by (and, in some cases, are described below with respect to) the system 100 of FIG. 1 (or components thereof), these methods can be implemented using any suitable hardware implementation. Similarly, while the system 100 of FIG. 1 (and/or components thereof) can operate according to the methods and techniques illustrated by FIGS. 2-8 (e.g., by executing instructions embodied on a computer readable medium), the system 100 can also operate according to other modes of operation and/or perform other suitable procedures.

Figure 2A:
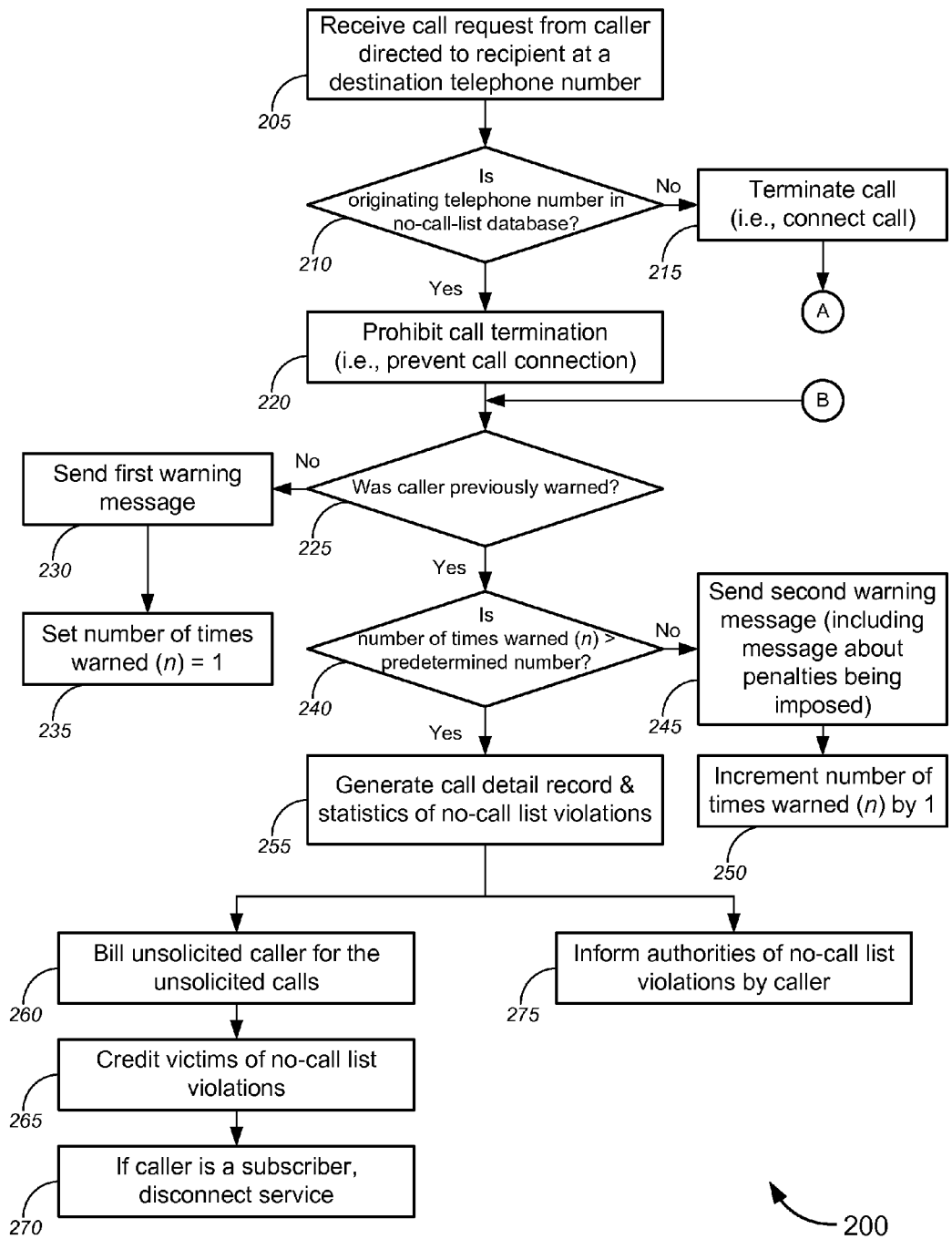
FIGS. 2A-2B are flow diagrams illustrating various methods for deterring or blocking unsolicited calls, in accordance with various embodiments.
Figure 2B:
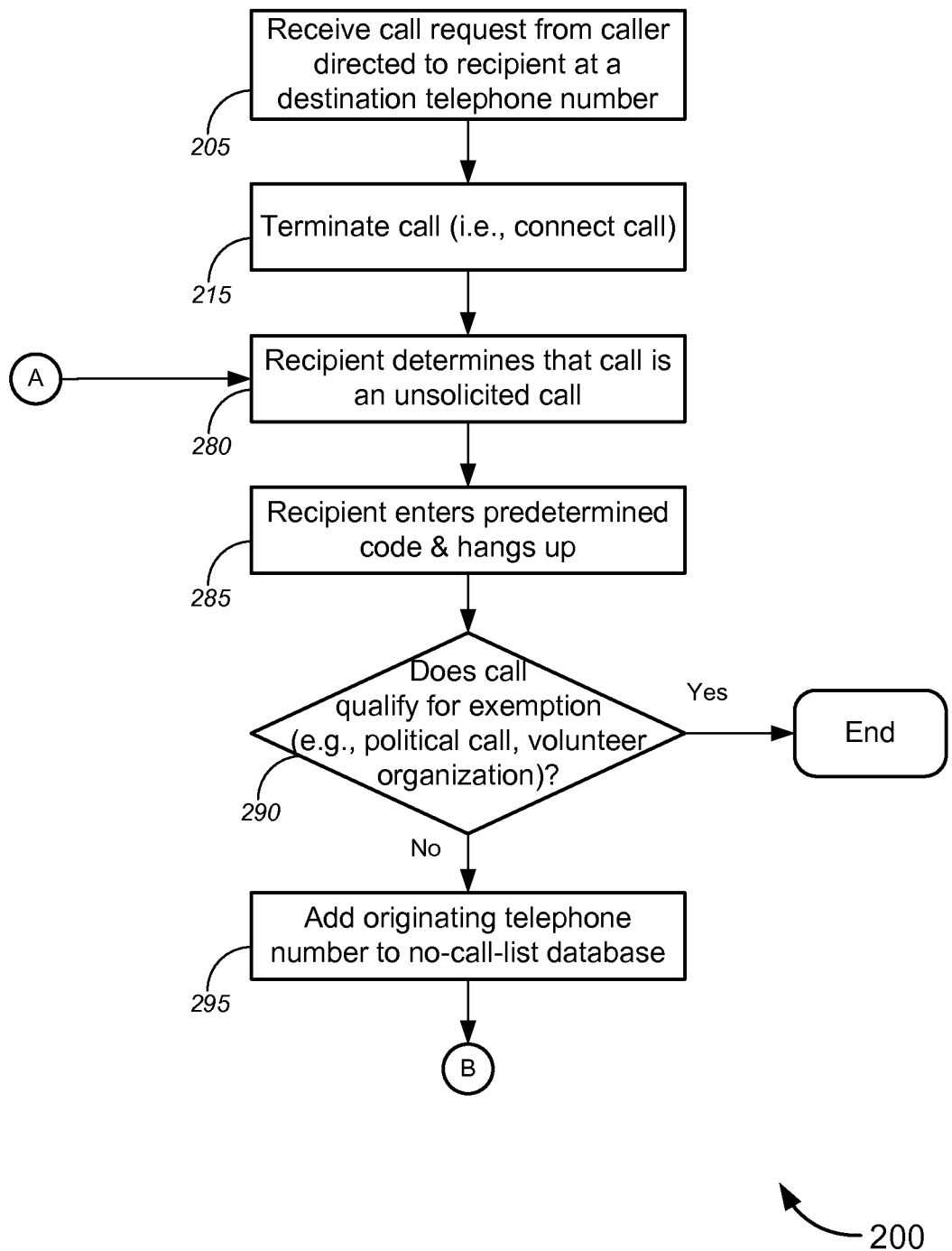

Turning to FIG. 2, FIGS. 2A-2B are flow diagrams illustrating various methods 200 for deterring or blocking unsolicited calls, in accordance with various embodiments. With reference to FIG. 2A, at block 205, a call request is received from a caller directed to a recipient at a destination telephone number. At block 210, a determination is made as to whether the originating telephone number is in a no-call-list database 130 (which could be any one or more of the databases 130 described above). If the system determines that the originating telephone number is not in a no-call-list database 130, then the call is terminated (i.e., the call is connected between the caller and the recipient) (block 215).

Based on a determination that the originating telephone number is in a no-call-list database 130, however, the system prohibits the call from terminating (i.e., prevents the call from being connected between the caller and the recipient)

(block 220). At block 225, the method 200 comprises determining whether the caller had previously been warned against making unsolicited calls. Based on a determination that the caller had not been previously warned, a first warning message can be sent (e.g., played on the line) to the caller at block 230. The first warning message may include, for example, a simple warning not to call telephone numbers on the no-call-list again, a warning not to call the destination telephone number again, and/or a warning indicating that further calls will violate unsolicited calling restrictions. At block 235, the method 200 might include establishing a counter ("warning counter"; such as a counter byte or counter value) that sets the number of times the caller is warned ("n") to a value of '1.'

Based on a determination that the caller had previously been warned, however, the method 200 can include determining, at block 240, whether the number of times warned (n) exceeds, or is greater than, a predetermined number (e.g., a specified number in the range of 1 and 5). If it is determined that the number of times warned (n) does not exceed the predetermined number, then a second warning message is sent at block 245. The second warning message may include, for example, warnings that future no-call list violations may result in penalties being imposed (e.g., the service provider billing the solicitor for unsolicited calls, the service provider disconnecting telephone service to the solicitor (if the solicitor is a subscriber of the service provider), and/or the service provider notifying authorities 160 of the no-call violations by the solicitor, etc.). At block 250, the counter is incremented by one (i.e., the number of times the caller is warned (n) is increased by '1').

If it is determined that the number of times warned (n) does exceed the predetermined number (which may be, e.g., a value of 1, 2, 3, 4, or 5), the penalties may be imposed against the caller (i.e., solicitor). For example, at block 255, the system might generate a call detail record (CDR) and/or compile statistics of no-call list violations by the caller. In some embodiments, the CDR and statistics may be generated by computer system 125 and/or by a clearinghouse 150. In some embodiments, the system might send a bill to the caller (block 260) for the unsolicited calls, e.g., based at least in part on the CDR and/or based at least in part on the statistics of no-call list violations. In some embodiments, the victims of the no-call list violations (i.e., the called subscribers) may, at block 265, be (partially or fully) credited from any payments made by the solicitor (i.e., caller) in response to receiving the bill sent in block 260. This can be accomplished, for example, by interfacing with a billing system of the service provider 115 to instruct the billing system to apply an appropriate credit.

According to some embodiments, the caller might be disconnected from services provided by the service provider 115 (block 270), in the case that the caller is also a subscriber of service provider 115. In some embodiments, the system might notify the authorities 160 (e.g., law enforcement or a regulatory agency) of no-call list violations by the caller (block 275), perhaps in a complaint or a request that action be taken (e.g., imposition of a fine or seeking of court injunctions, etc.), where the CDR and/or statistics of no-call list violations may be sent to the authorities together with any such complaint or request. The remedies described in conjunction with blocks 260-275 can be combined in any fashion or order, in accordance with various embodiments.

With reference to FIG. 2B, two types of situations may arise. In a first situation, a call request is received from a caller directed to a recipient at a destination telephone number (as in block 205, as shown in FIG. 2A), and the call is immediately terminated (i.e., the call is immediately connected with the recipient (or subscriber) at the destination telephone number), prior to proceeding to block 280—i.e., without determining whether the caller originates unsolicited calls. In a second situation, blocks 205 through 215 in FIG. 2A are first performed with a determination that the originating telephone number is not in the no-call-list database 130, prior to proceeding to block 280. In either case, the call is terminated (block 215) to the subscriber number.

At block 280, the recipient (or subscriber) determines that the call is an unsolicited call, and, at block 285, the subscriber provides input to the system to indicate that determination. For example, the caller might enter a predetermined code (e.g., using DTMF tones) and hangs up (e.g., by putting the receiver of the telephone set "on hook" or by pressing a hard/soft button on a mobile device that "ends call"). Alternatively and/or additionally, other user interfaces might be provided (for example, as described in detail below) to allow the subscriber to provide such input.

In some cases, the system might determine, at block 290, whether the call qualifies for exemption from being listed in the no-call-list. For example, political calls, and calls by nonprofit organizations, etc., might qualify for exemption (or, in some cases, might not). If it is determined that the call qualifies for exemption, then the process ends. Otherwise, based on a determination that the call fails to qualify for exemption, or if the system is not configured to make any determination regarding possible exemptions, the system adds the originating telephone number to the no-call-list database 130 (block 295). The process may optionally return to block 225, as shown in FIG. 2A. Alternatively, the process may end at block 295.

Figure 3:
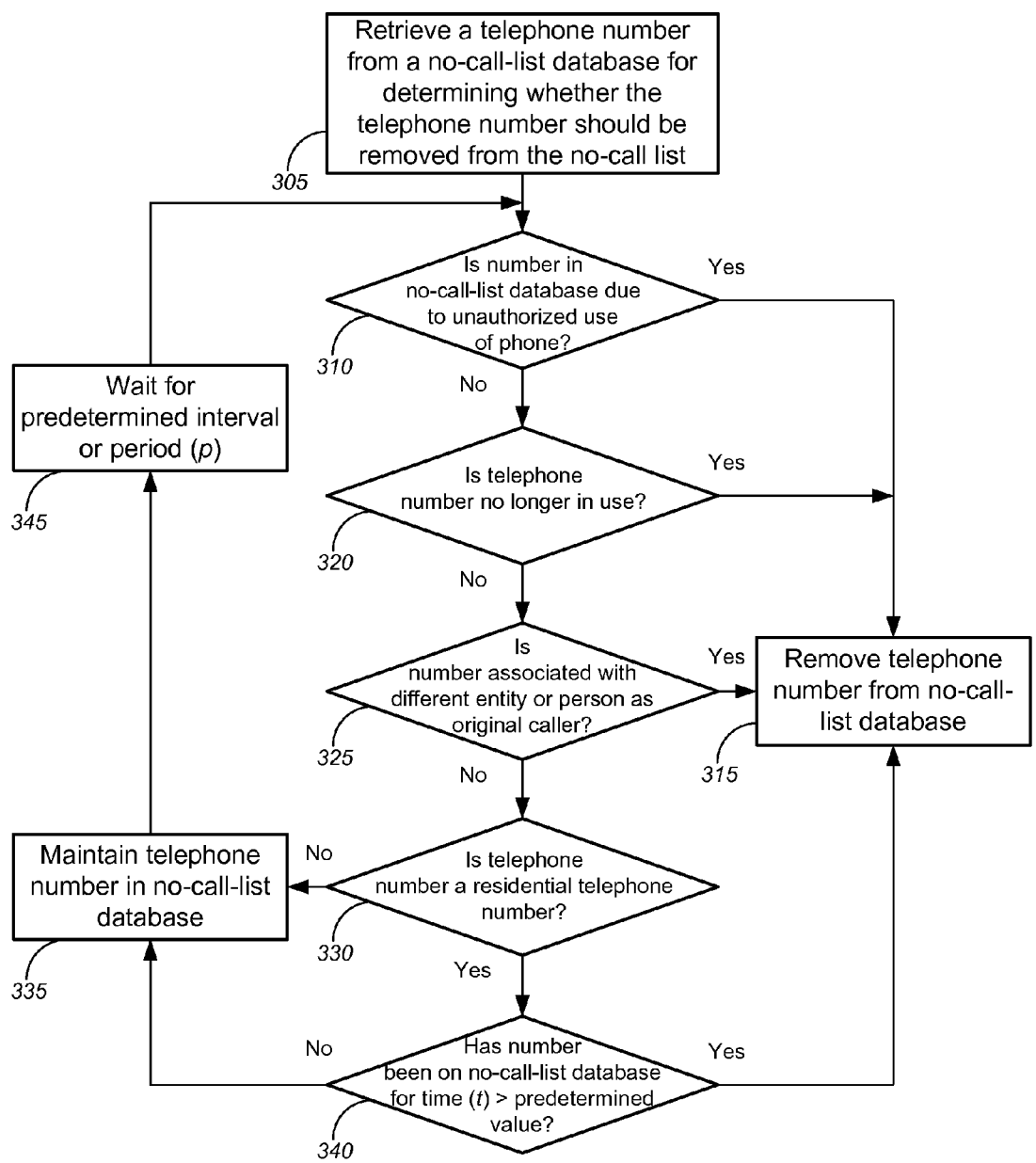
FIG. 3 is a flow diagram illustrating a method for determining whether a telephone number should be removed from a no-call-list database, in accordance with various embodiments.

We now turn to FIG. 3, which is a flow diagram illustrating a method 300 for determining whether a telephone number should be removed from a no-call-list database, in accordance with various embodiments. At block 305, a telephone number is retrieved from a no-call-list database (e.g., database 130 as shown in FIG. 1) in order to determine whether the telephone number should be removed from the no-call list. This function may be done, for example, in response to a request (from the caller associated with the number, from a subscriber, etc.) that the telephone number be removed, and/or in response to a service provider's internal periodic status check of all or a subset of telephone numbers on the no-call list. At block 310, the method includes determining (e.g., by computer system 115 as shown in FIG. 1 or by some other system) whether the telephone number in the no-call-list database was added to the database due to unauthorized use of the telephone number or a phone associated with said telephone number. Alternatively and/or additionally, the system could determine whether the telephone number was added in error. Based on a determination that the telephone number was added to the no-call list or no-call-list database due to unauthorized use (or by error) by someone other than the owner of the telephone or number, the telephone number can be removed (e.g., by computer system 115 or by some other system) from the no-call list or no-call-list database (block 315).

The method 300 can also include determining, at block 320, whether the telephone number is no longer in use. If so, the method 300 proceeds to block 315, and the telephone number can be removed from the no-call list. Otherwise, at block 325, the method 300 can include determining whether the telephone number is now associated with an entity or person(s) that is different from the original caller (i.e., the caller whose unsolicited calls resulted in the telephone number being added to the no-call list). Merely by way of example, such a determination can be made by reference to telephone directories and/or the like. If so, the number can be removed from the list (block 315).

In some cases, the system might determine whether the telephone number is a residential telephone number (block 330). Based on a determination that the telephone number is not a residential telephone number (e.g., a commercial telephone number), the telephone number might be maintained in the no-call-list database (block 335). If, on the other hand, the telephone number is determined to be a residential telephone number, then, at block 340, the system might determine whether the telephone number has been on the no-call list (i.e., in the no-call-list database) for a time (t) exceeding a predetermined value (e.g., 6 months, a year, 18 months, 2 years, 3 years, 5 years, etc.). If so, the method 300 might proceed to block 315, at which point the telephone number is removed from the no-call list. If not, the method might proceed to block 335 (i.e., the telephone number is maintained in the no-call list). At block 345, the service provider and/or the computer system might wait for a predetermined interval or period (p) (e.g., 6 months, a year, 18 months, 2 years, 3 years, 5 years, etc., or monthly intervals, two month intervals, or three month intervals, six month intervals, etc.), prior to returning to block 305 or block 310.

Figure 4:
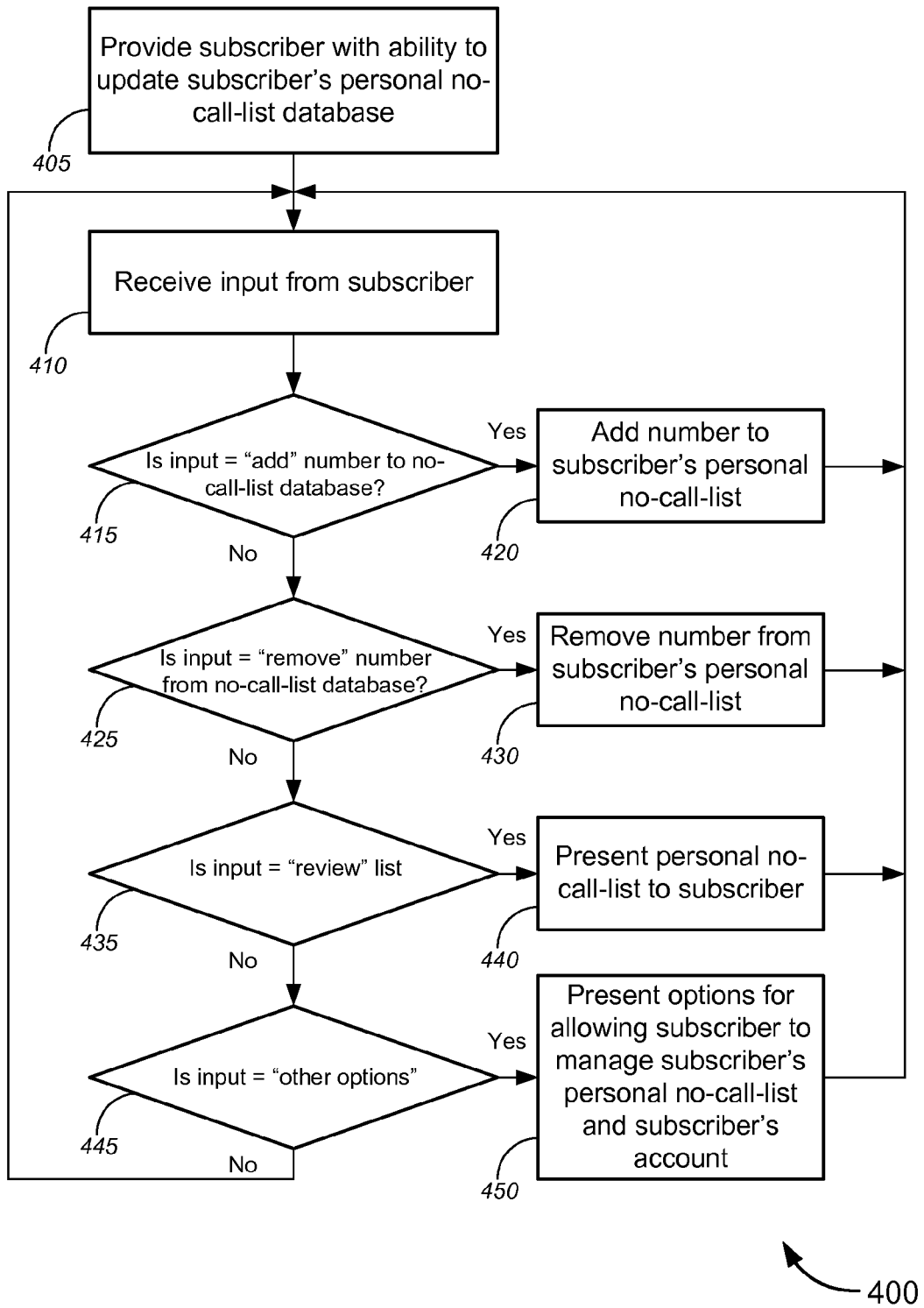
FIG. 4 is a flow diagram illustrating a method for providing a subscriber with a capability to update the subscriber's personal no-call list, in accordance with various embodiments.

FIG. 4 is a flow diagram illustrating a method 400 for providing a subscriber with a capability to update the subscriber's personal no-call list, in accordance with various embodiments. At block 405, the subscriber is provided (e.g., by computer system 125 or some other component of service provider 115) with access to, and/or the ability or functionality to update, the subscriber's personal no-call list or no-call-list database 130*c*. At block 410, input is received (by, e.g., the computer system 125, etc.) from the subscriber. It is then determined, at block 415, whether the input is an input associated with "adding" a telephone number to the no-call list or the no-call-list database 130*c*. At block 420, based on a determination that an "add" (telephone number) command is input, the telephone number is added to the subscriber's personal no-call list or no-call-list database 130*c* (this includes prompting the user for the telephone number to be added if the number is not included in the "add" command). The method 400 subsequently returns to block 410. If an "add" command is not input, then the method 400 proceeds to block 425.

At block 425, the method 400 comprises determining whether the input is an input associated with "removing" a telephone number from the no-call list or the no-call-list database 130*c*. At block 430, based on a determination that a "remove" (telephone number) command is input, the telephone number is removed from the subscriber's personal no-call list or no-call-list database 130*c* (this includes prompting the user for the telephone number to be removed if the number is not included in the "remove" command). The method 400 subsequently returns to block 410. If a "remove" command is not input, then the method 400 proceeds to block 435.

At block 435, the system determines whether the input is an input associated with "reviewing" the list of telephone numbers in the no-call list or the no-call-list database 130*c*. At block 440, based on a determination that a "review" (telephone number list) command is input, the subscriber's personal no-call list obtained from the no-call-list database 130*c* is presented to the subscriber (e.g., displayed on an electronic display of a device associated with the subscriber or read-out to the subscriber). The method 400 subsequently returns to block 410. If a "review" command is not input, then the method 400 proceeds to block 445.

At block 445, the system determines whether the input is an input associated with "other options" related to the subscriber's personal no-call list or the no-call-list database 130*c*. At block 450, based on a determination that an "other options" command is input, the subscriber is presented with options (e.g., by displaying on an electronic display of a device associated with the subscriber or by reading out to the subscriber) options for allowing the subscriber to manage the subscriber's personal no-call list stored on the no-call-list database 130*c* and/or to manage his or her account. After the subscriber has completed managing his or her personal no-call list and/or his or her account, the method 400 subsequently returns to block 410. If an "other options" command is not input, then the method 400 also returns to block 410.

Figure 5:
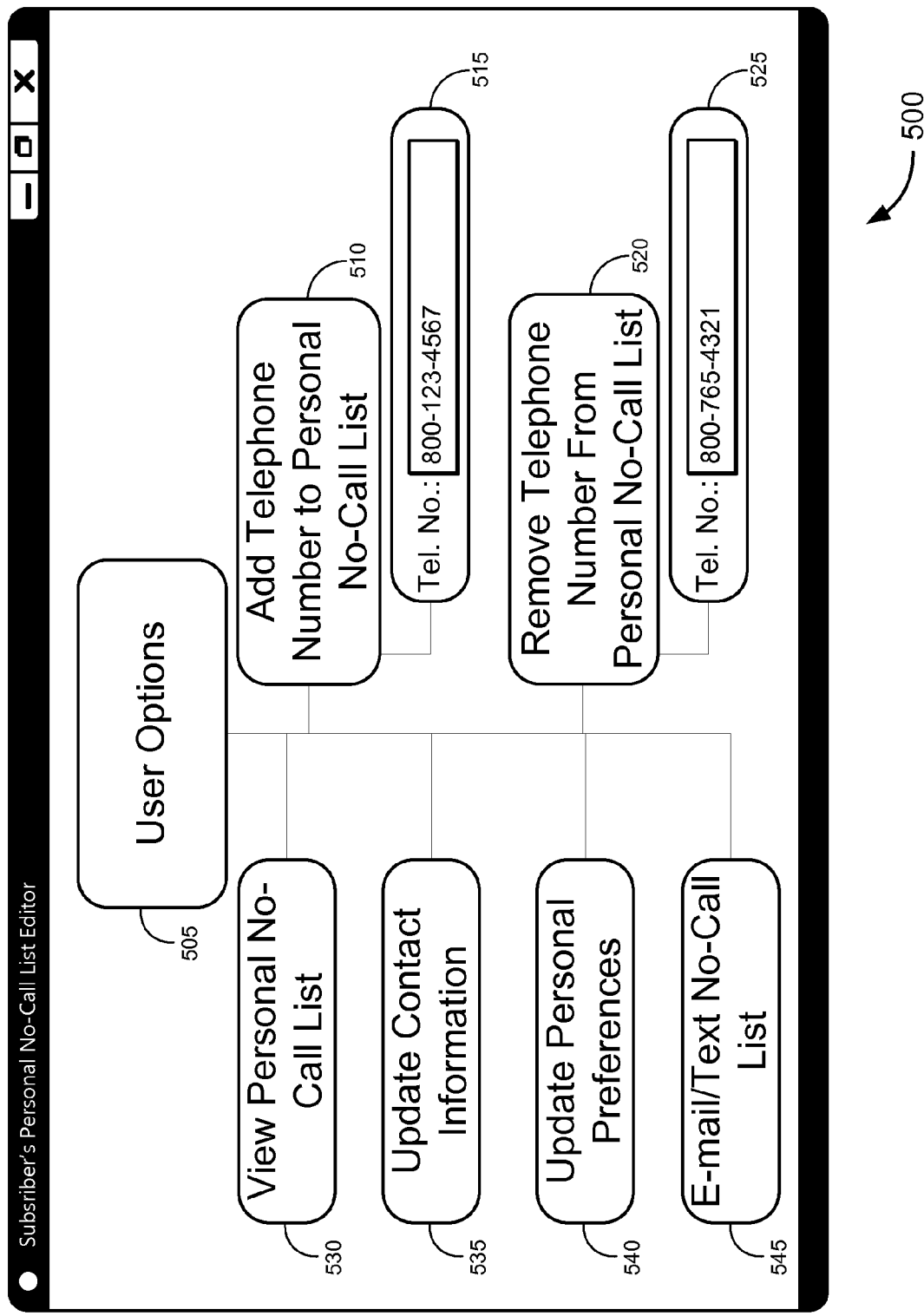
FIG. 5 is an exemplary illustration of a screen display from a user interface for allowing a subscriber to update the subscriber's personal no-call list, for example, according to the method 400 as illustrated in FIG. 4, and in accordance with various embodiments.

FIG. 5 is an exemplary illustration of a screen display from a user interface 500 for allowing a subscriber to update the subscriber's personal no-call list, for example, according to the method 400 as illustrated in FIG. 4, and in accordance with various embodiments. (The exemplary interface 500 might be provided via a web server and/or the like. Alternatively and/or additionally, other interfaces, such as a DTMF or IVR interface for telephonic use by a subscriber, can be provided as well.) According to some embodiments, and as shown in FIG. 5, user interface 500 may be a user interface for a subscriber's personal no-call list editor, which the subscriber may use to manage his or her personal no-call list and/or his or her account. For example, clicking on a "User Options" link or button 505 may reveal a tree of options 510-545 or may open a document, webpage, or other interface/window that presents one or more of options 510-545. Clicking on an "Add" or "Add Telephone Number to Personal No-Call List" link or button 510 may reveal a prompt 515 for a telephone number to be added to the subscriber's personal no-call list or the no-call-list database 130*c*. Revealing the prompt 515 may include at least one of revealing a text input field 515 in the user interface 500, opening a document that prompts for the telephone number, opening a webpage that prompts for the telephone number, or opening a sub-window or secondary interface that prompts for the telephone number.

Likewise, clicking on a "Remove" or "Remove Telephone Number From Personal No-Call List" link or button 520 may reveal a prompt 525 for a telephone number to be removed from the subscriber's personal no-call list or the no-call-list database 130*c*. Revealing the prompt 525 may include at least one of revealing a text input field 525 in the user interface 500, opening a document that prompts for the telephone number, opening a webpage that prompts for the telephone number, or opening a sub-window or secondary interface that prompts for the telephone number.

Clicking on a "View Personal No-Call List" link or button 530 may present the subscriber with a list of telephone numbers on the subscriber's personal no-call list stored on the no-call-list database 130*c*. Presenting the subscriber's personal no-call list may include at least one of displaying the subscriber's personal no-call list in the user interface 500, opening/downloading a document that lists the telephone numbers in the subscriber's no-call list, opening a webpage that displays the telephone numbers in the subscriber's no-call list, or opening a sub-window or secondary interface that displays the telephone numbers in the subscriber's no-call list.

Other options include updating the subscriber's contact information (e.g., by clicking on the "Update Contact Information" link or button 535), updating the subscriber's personal preferences (e.g., by clicking on the "Update Personal Preferences" link or button 540), and sending the subscriber's no-call list or the list of telephone numbers in the subscriber's no-call list via e-mail or text message (e.g., by clicking the "E-mail/Text No-Call List" link or button 545). If any of buttons 535-545 are clicked, options or other additional prompts may be revealed or presented in a similar manner as discussed above with respect to clicking buttons 510, 520, and 530.

With reference to the user interface 500 of FIG. 5, although the description above is in relation to a user clicking on one or more buttons 505-545, it is also understood that by so clicking, a processor (e.g., of computer system 125 or computer 145 or some other computer system (such as the user's mobile device or other user computer, etc.)) that is associated with displaying the user interface 500 to the user may be configured to receive inputs corresponding to clicking by the user of the one or more buttons 505-545.

In general, a variety of user interfaces may be provided in accordance with various embodiments, including without limitation graphical user interfaces that display, for a user, display screens for providing information to the user and/or receiving user input from a user.

Merely by way of example, in some embodiments, the computer system 125 may be configured to communicate with a client computer (e.g., computer 145, mobile device 110*b*, or some other client device not shown in FIG. 1, etc.) via a dedicated application running on the client computer; in this situation, the user interface (e.g., user interface 500) might be displayed by the client computer, based on data and/or instructions provided by the computer system 125. In this situation, providing the user interface might comprise providing instructions and/or data to cause the client computer to display the user interface. In other embodiments, the user interface may be provided from a web site, e.g., by providing a set of one or more web pages, which might be displayed in a web browser running on the user computer and/or might be served by a web server (not shown in FIG. 1). In various embodiments, the computer system 125 might comprise the web server and/or be in communication with the web server, such that the computer system 125 provides data to the web server to be incorporated in web pages served by the web server for reception and/or display by a browser at the user computer.

In some embodiments, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a user interface will comprise providing one or more display screens (e.g., as shown in FIG. 5 and as described above), each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Examples of such embodiments are described above with respect to FIG. 5.

In another aspect, the methods and systems described above can be used to implement functionality that essentially is opposite in nature. For example, customers or subscribers might be provided with access to the same type of tools to subscribe to contact lists (including, but not limited to, call lists, text message lists, and/or e-mail lists). There are multiple ways to provide such functionality. For example, customers or subscribers could subscribe to a contact list(s) that service providers may make available to solicitors. Contact lists can be specific to certain topics, including, but not limited to, specials and/or discounts related to, e.g., restaurants (e.g., fast-food, dine-in, high-end dining, etc.), shopping (e.g., clothing, household items, electronics, etc.), entertainment (e.g., movies, theater/opera, concerts, etc.), and multimedia (e.g., CDs, DVDs, Blu-ray™ discs, music downloads, movie downloads, etc.). Solicitors might publish telephone numbers, e-mail addresses, text messaging numbers, and/or web-links through the service provider (or independently) that can be used by customers or subscribers to subscribe to the solicitors' contact list(s) (e.g., call lists, text message lists, e-mail lists, etc.). Subscribers might consent to such arrangements in return for payments or other rewards.

Figure 6:
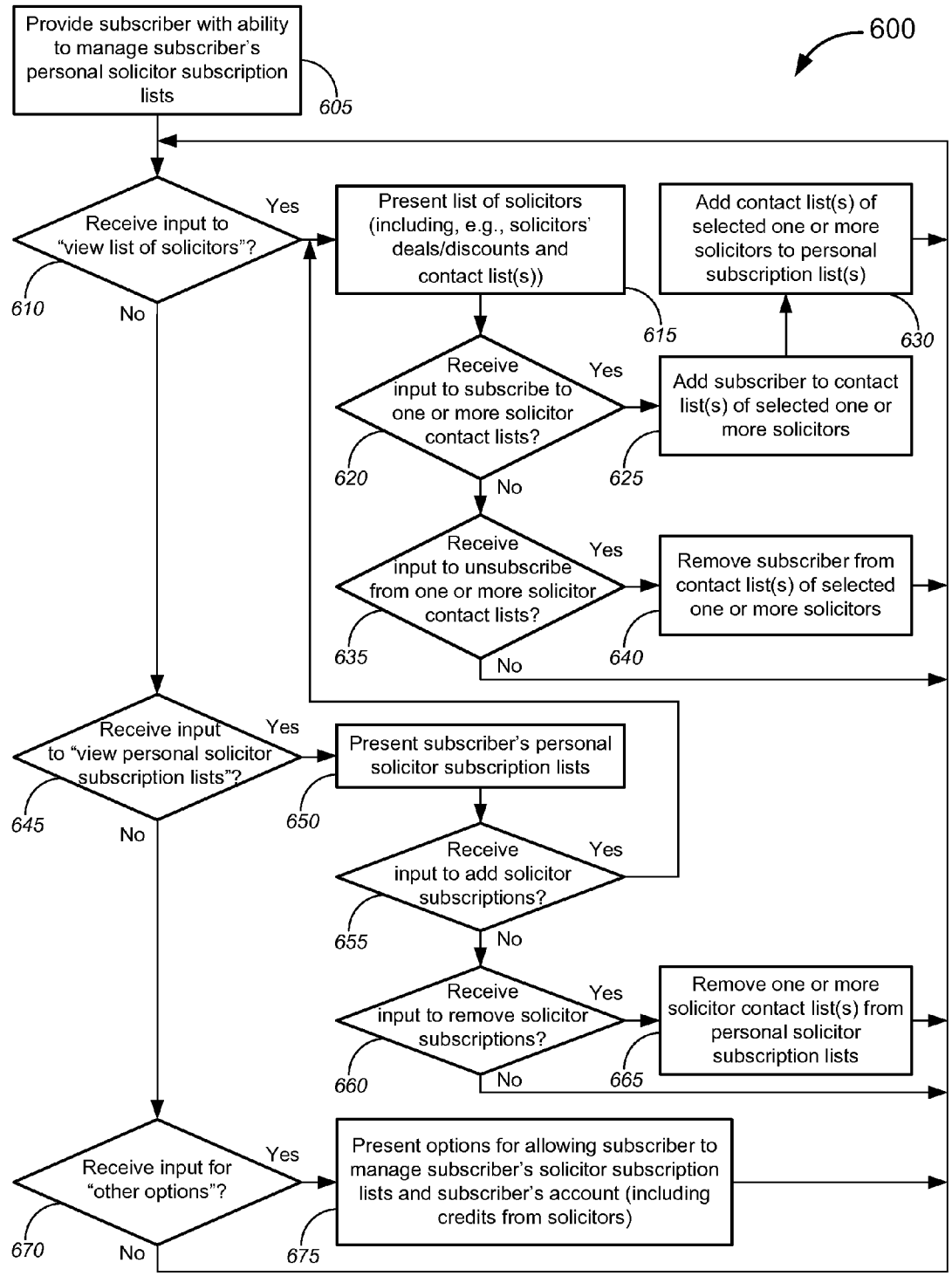
FIG. 6 is a flow diagram illustrating a method for providing a subscriber with a capability to manage the subscriber's personal solicitor subscriptions list, in accordance with various embodiments.
Figure 7:
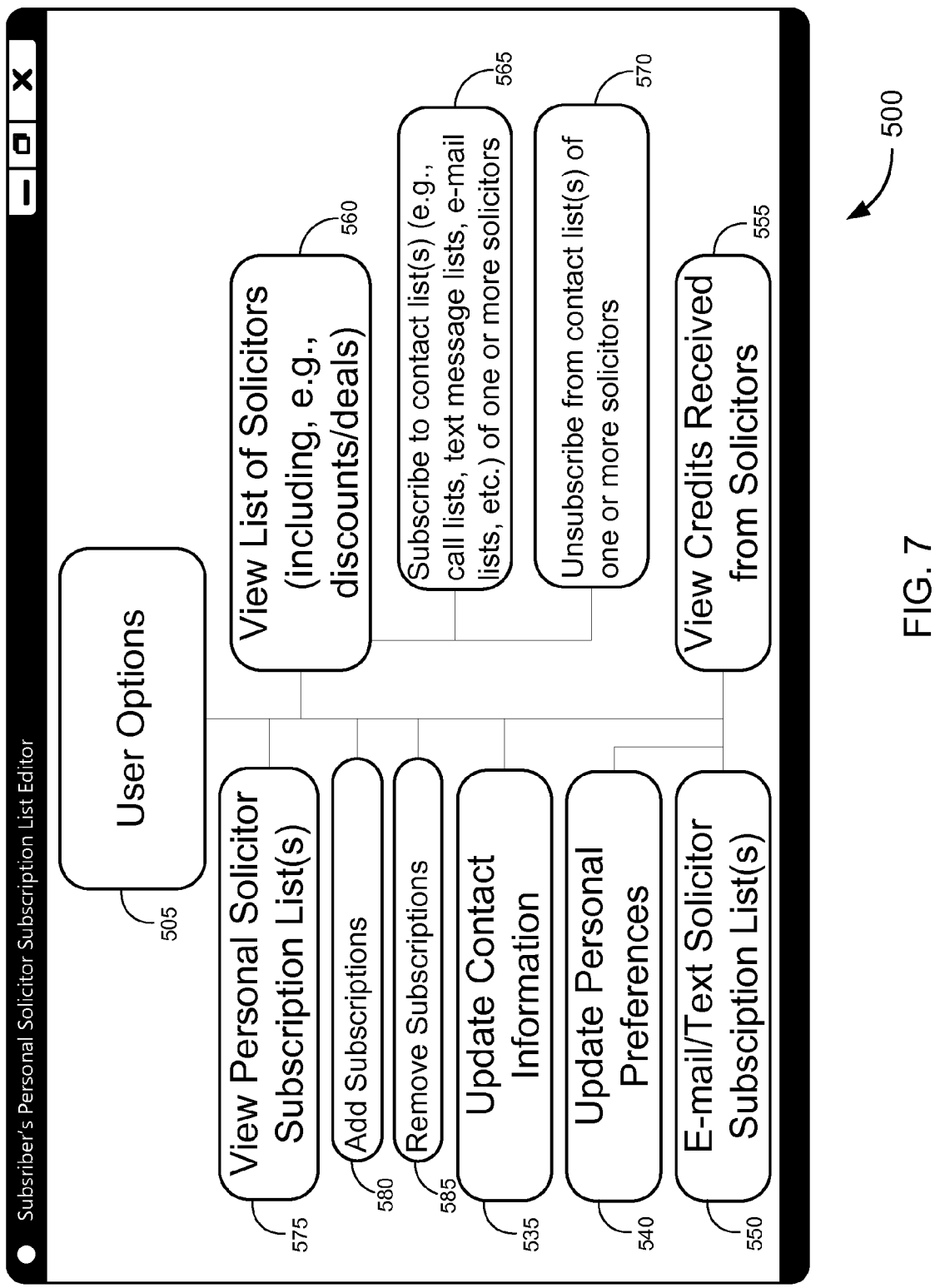
FIG. 7 is an exemplary illustration of a screen display from a user interface for allowing a subscriber to manage the subscriber's personal solicitor subscriptions list, for example, according to the method 600 as illustrated in FIG. 6, and in accordance with various embodiments.

Thus, FIGS. 6 and 7 illustrate another feature of some embodiments, in which the subscriber can be provided with the option to subscribe or unsubscribe from contact list(s) (e.g., call lists, text message lists, e-mail lists, etc.) that are published or otherwise provided by solicitors (in some cases, provided via the service provider 115). In some embodiments, at least one of the components and/or systems as used above for the no-call list deterrence system and method may be used for managing the subscriber's solicitor subscriptions. In other embodiments, different components and/or systems (albeit it similar components and/or systems) may be used for managing the subscriber's solicitor subscriptions. In an aspect of some embodiments, the same system and/or method might be used to allow some subscribers to avoid unsolicited calls (as described above) and allow other subscribers to subscriber to contact lists (as described below). Alternatively and/or additionally, the same subscriber might use an embodiment to avoid some unsolicited calls and also to subscriber to some contact lists.

FIG. 6 is a flow diagram illustrating a method for providing a subscriber with a capability to manage the subscriber's personal solicitor subscriptions list, in accordance with various embodiments. At block 605, the subscriber is provided (e.g., by computer system 125 or some other component of service provider 115) with access to, and/or the ability or functionality to manage, the subscriber's personal solicitor subscription list(s). In some embodiments, the subscriber may be provided with options to create multiple lists, e.g., one for each particular topic (e.g., one for restaurant deals, one for entertainment deals, one for shopping deals, one for personal favorites, one for family favorites, one for favorites of the group(s) to which the subscriber belongs, and so on). Alternatively, a single subscription list may be implemented with labels or folders for each of the particular topics.

At block 610, it is determined whether the subscriber has input a command associated with "viewing a list of solicitors." Based on a determination that a "view solicitor list" command is input, at block 615, a list of solicitors is presented to the subscriber. Within the list of solicitors, which may be updated by the service provider or by some third party service affiliated with the service provider, contact list(s) (e.g., call lists, text message lists, and/or e-mail lists, etc.) may be provided. In some embodiments, at least one of each solicitor's promotional deals or discounts may also be listed. It is then determined, at block 620, whether a "subscribe" command is input for one or more solicitors and for one or more contact lists of the selected one or more solicitors. In response to a determination that a "subscribe" command is input, the subscriber is added to the selected contact list(s) (e.g., call lists, text message lists, and/or e-mail lists, etc.) of the selected one or more solicitors (at block 625). For any contact list(s) of the one or more solicitors that are subscribed to, the selected contact list(s) of the selected one or more solicitors may be added to the subscriber's personal solicitor subscription list(s) (at block 630). In the alternative or in addition, if it is determined that an "unsubscribe" command is input, at block 635, then based on this determination, the subscriber is removed from the selected contact list(s) of the selected one or more solicitors (at block 640). If an "unsubscribe" command is not input, then the method 600 returns to block 610.

It is determined, at block 645, whether the subscriber has input a command associated with "viewing the subscriber's personal solicitor subscription list(s)." Based on a determination that a "view subscription list(s)" command is input, at block 650, the subscriber's personal solicitor subscription list(s) is presented to the subscriber. At block 655, it is determined whether an "add solicitor subscription(s)" command has been input by the subscriber. Based on a determination that an "add solicitor subscription(s)" command has been input, the method 600 proceeds to blocks 615-630.

In the alternative or in addition, it is determined, at block 660, whether a "remove solicitor subscription(s)" command has been input. Based on a determination that a "remove solicitor subscription(s)" command has been input, the selected contact list(s) of the selected one or more solicitors is removed from the subscriber's personal solicitor subscription list(s) (at block 665). If a "remove solicitor subscriptions" command is not input, then the method 600 returns to block 610.

At block 670, it is determined whether the subscriber has input a command associated with "other options." Based on a determination that an "other options" command is input, at block 675, the subscriber is presented with (e.g., by displaying on an electronic display of a device associated with the subscriber or by reading out to the subscriber) options for allowing the subscriber to manage the subscriber's personal solicitor subscriptions list (which is stored in database 130c or alternatively in a database similar to database 130c) and/or to manage his or her account (including, but not limited to, updating contact information, updating personal preferences, selecting to have the subscriber's personal solicitor subscription list(s) e-mailed or sent to the subscriber via text message, or viewing credits received from solicitors (e.g., from opting into the subscriptions, from completion by the subscriber of surveys provided by/on behalf of one or more solicitors, and/or from completion of other tasks offered by one or more solicitors)). Credits may include money, discounts on products or services, credits for affiliated products or services, etc. Surveys may include phone surveys or Internet surveys, etc. After the subscriber has completed managing his or her personal solicitor subscriptions list(s) and/or his or her account, the method 600 subsequently returns to block 610. If an "other options" command is not input, then the method 600 also returns to block 610.

FIG. 7 is an exemplary illustration of a screen display from a user interface for allowing a subscriber to manage the subscriber's personal solicitor subscriptions list, for example, according to the method 600 as illustrated in FIG. 6, and in accordance with various embodiments. (The exemplary interface 500, as discussed above with respect to FIG. 5, might be provided via a web server and/or the like. Alternatively and/or additionally, other interfaces, such as a DTMF or IVR interface for telephonic use by a subscriber, can be provided as well.) According to some embodiments, and as shown in FIG. 7, user interface 500 (which may be an extension or alternative to user interface 500 as shown in FIG. 5) may be a user interface for a subscriber's personal solicitor subscription list editor, which the subscriber may use to manage his or her personal solicitor subscription list(s) and/or his or her account. For example, clicking on a "User Options" link or button 505 may reveal a tree of options 510-585 or may open a document, webpage, or other interface/window that presents one or more of options 510-585.

Links or buttons 535 and 540 might be the same as, or perform the same functionalities as described above with respect to, the "Update Contact Information" link or button 535 and the "Update Personal Preferences" link or button 540, respectively, as in the user interface of FIG. 5. Other options include sending the subscriber's personal solicitor subscription list(s) via e-mail or text message (e.g., by clicking the "E-mail/Text No-Call List" link or button 550), and viewing credits received from solicitors for opting into the subscriptions and/or for completing solicitor-promoted surveys or other tasks (e.g., by clicking the "View credits received from solicitors" link or button 555). Credits may include money, discounts on products or services, credits for affiliated products or services, etc.

Clicking on a "View List of Solicitors" link or button 560 may present the subscriber with a list of solicitors. Contact list(s) (e.g., call lists, text message lists, and/or e-mail lists, etc.) of one or more solicitors may be provided within the list of solicitors, which may be updated by the service provider or by some third party service affiliated with the service provider. In some embodiments, at least one of each solicitor's promotional deals or discounts may also be listed within the list of solicitors (in some embodiments, together with each solicitor's listing). Together with the list of solicitors, links or buttons 565 and 570 may be presented that allow the subscriber to, respectively, "subscribe" to one or more contact lists (e.g., call lists, text message lists, and/or e-mail lists, etc.) of one or more solicitors and "unsubscribe" from one or more contact lists of selected one or more solicitors.

Clicking on a "View Personal Solicitor Subscription List(s)" link or button 575 may present the subscriber with one or more of the subscriber's personal solicitor subscription lists. Together with the subscriber's personal solicitor subscription list(s), links or buttons 580 and 585 may be presented that allow the subscriber to, respectively, add subscriptions to selected one or more contact lists of selected one or more solicitors and/or remove subscriptions from selected one or more contact lists of selected one or more solicitors. In adding subscriptions, the subscriber may be presented with the list of solicitors and the list of contact list(s) of the solicitors for adding to the subscriber's personal solicitor subscription list(s).

FIGS. 8A-8H (collectively, "FIG. 8") are flow diagrams illustrating a method 800 for blocking unsolicited calls from callerID-spoofing autodialing devices or the like, in accordance with various embodiments. The embodiments as represented in FIG. 8 are merely illustrative and are not intended to limit the scope of the various embodiments. With reference to FIG. 8, method 800 in FIG. 8A continues onto FIGS. 8B, 8C, 8D, 8E, 8F, 8G, and 8H, linked by circular markers denoted by "A," "B," "C," "D," "E," "F," and "G," respectively.

While the techniques and procedures are depicted and/or described in a certain order for purposes of illustration, it should be appreciated that certain procedures may be reordered and/or omitted within the scope of various embodiments. Moreover, while the method illustrated by FIG. 8 can be implemented by or with (and, in some cases, are described below with respect to) the system 100 of FIG. 1 (or components thereof), such methods may also be implemented using any suitable hardware implementation. Similarly, while system 100 of FIG. 1 (or components thereof) can operate or be used according to the method illustrated by FIG. 8 (e.g., by executing instructions embodied on a computer readable medium), the system 100 can each also operate according to other modes of operation and/or perform other suitable procedures.

Figure 8A:
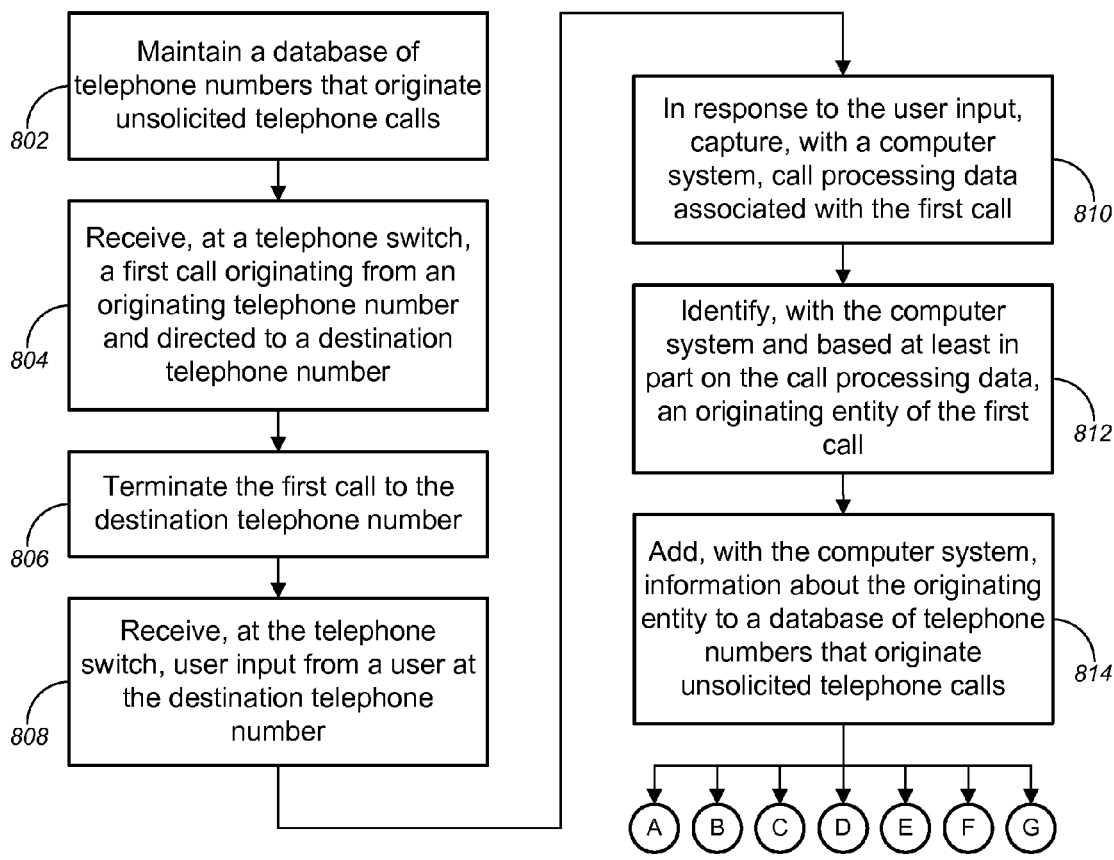
Figure 8H:
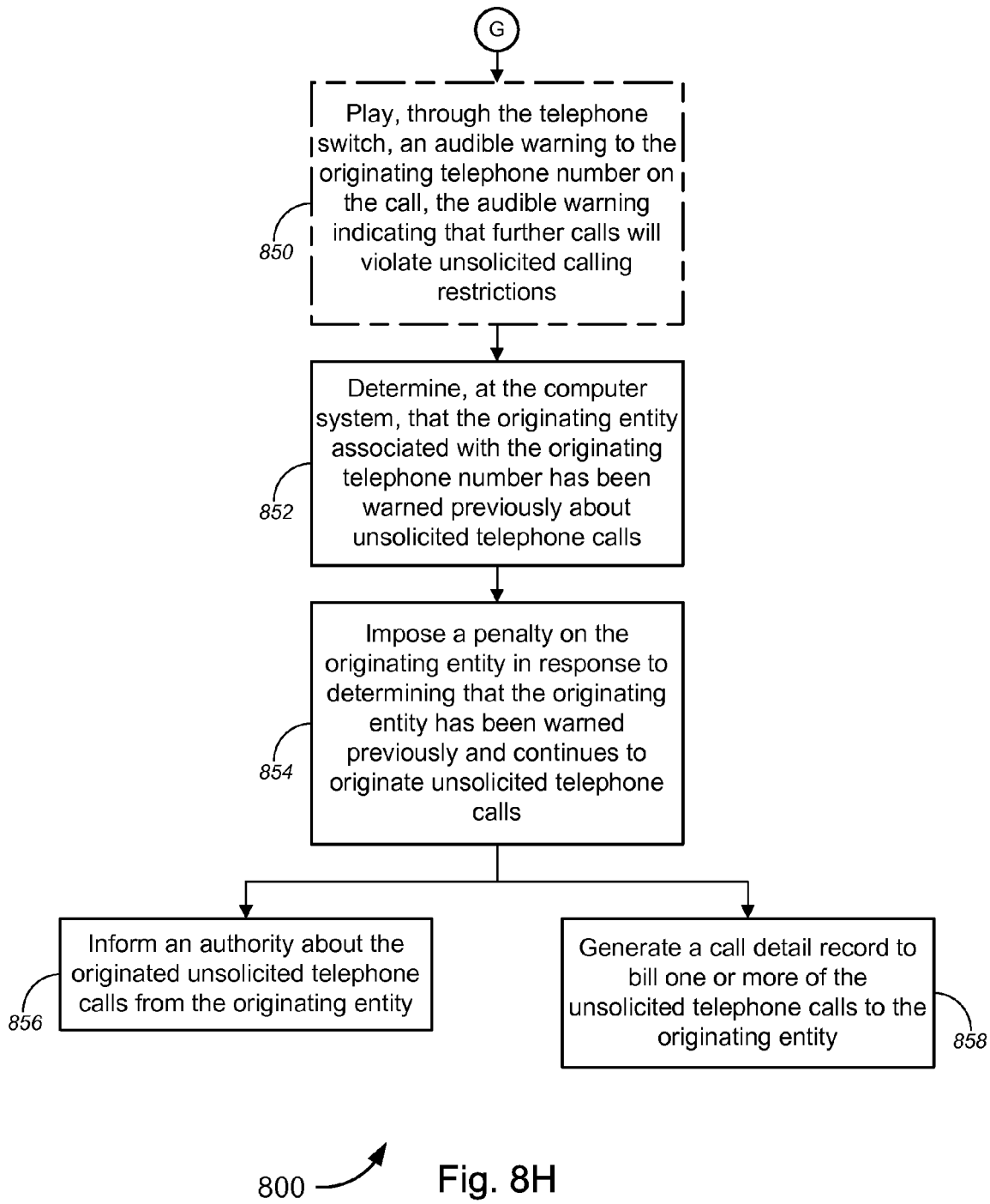

In the embodiment of FIG. 8A, method 800 might comprise, at block 802, maintaining a database of telephone numbers that originate unsolicited telephone calls. At block 804, method 800 might comprise receiving, at a telephone switch, a first call originating from an originating telephone number and directed to a destination telephone number. Method 800 might further comprise terminating the first call to the destination telephone number (block 806) and receiving, at the telephone switch, user input from a user at the destination telephone number (block 808).

At block 810, method 800 might comprise, in response to the user input (that is received by the telephone switch from the telephone at the destination telephone number during the first call from the originating telephone number and terminated to the destination telephone number by the telephone switch), capturing, with a computer system, call processing data associated with the first call. In some embodiments, the call processing data might comprise information from a call detail record ("CDR") or other appropriate call processing data. This information can include, without limitation, some or all of the following information: information on where the call originated, time of day, date, call duration, billing rate, and/or the like. This information can be correlated with switch information to confirm the origin of the call (such as information from an originating switch in communication with the unsolicited caller).

In some cases, the telephone switch might include, without limitation, one or more of the computer system, a class 5 wireline switch, a voice over Internet Protocol ("VoIP") softswitch, a mobile switching center ("MSC"), and/or the like. In some instances, the first call might be one of a telemarketing voice call or a telemarketing text message, or the like. Alternatively, the first call might be one of a prank telephone call or a prank text message. According to some embodiments, the user input might comprise one or more DTMF tones received by the telephone switch from the telephone at the destination telephone number during the first call. In some cases, the user input might include, without limitation, electronic signals in response to push button input by the user at the destination telephone. In some instances, the push button input might include, but is not limited to, one or more of a hard or physical button depression/input, a soft or virtual button touch input, a numeric button input, a menu selection input (indicating "unwanted call," "unsolicited call," "block call," "reject call," or the like), the asterisk or "*" button, the pound, hash, or "#" button, and/or the like. In the case of unwanted or unsolicited text messages, the user input might include, without limitation, one or more of forwarding the unwanted text message to a local, nation, or international "no-call" or "no-text" registry, forwarding the unwanted text message to a telephone/telecommunications service provider, or a push button input, and/or the like. As with unwanted or unsolicited telephone calls, the push button input for indicating an unwanted or unsolicited text message might include, but is not limited to, one or more of a hard or physical button depression/input, a soft or virtual button touch input, a numeric button input, a menu selection input (indicating "unwanted text message," "unsolicited text message," "block text message," "reject text message," or the like), the asterisk or "*" button, the pound, hash, or "#" button, and/or the like.

According to some embodiments, the telephone switch might utilize or implement pattern recognition intelligence. For example, if the telephone switch detects a series of sequential voice calls or text messages (or other patterns of voice calls or text messages that have a suspicious nature, such as multiple calls/messages to random destination telephone numbers within a very short period repeatedly, or the like), the telephone switch (using or implementing pattern recognition intelligence) can proactively flag such voice calls or text messages from that originating point or source (or originating entity). For instance, a robo-caller may start making calls (which might include telephone calls or text messages) into an exchange starting with xxx-xxx-0000, xxx-xxx-0001, xxx-xxx-0002, xxx-xxx-0003, and so on (not necessarily starting with xxx-xxx-0000 or xxx-xxx-0001). The telephone switch can flag that behavior as suspicious and can follow up to determine whether the calls violate any laws. If they do, appropriate action (including, but not limited to, the penalties described herein, or the like) can be taken.

Another example of an algorithm may be as follows: The service provider obtains a copy of the no-call list and monitors calls to that list. If there is a series of calls from the same origination point or source (or originating entity) that is placing calls to members of the no-call list, the service provider (via the telephone switch, for example) might determine that a robo-caller or other unsolicited calling entity or device is violating the law. The originating telephone number and/or the originating entity can be flagged and a follow-up may be performed. In some embodiments, the algorithm could be enhanced by monitoring the call duration. If the calls are short (especially in the absence of other user input as described above), it could be an indication that the receiving party at the destination telephone number recognizes the call as an unwanted solicitation and immediately hangs up. That behavior could be an indication of illegal calling.

Method 800, at block 812, might comprise identifying, with the computer system and based at least in part on the call processing data, an originating entity of the first call. In some embodiments, identifying the originating entity of the first call might comprise correlating the call processing data with switch data to identify the originating entity. Method 800 might further comprise, at block 814, adding, with the computer system, information about the originating entity to a database of telephone numbers that originate unsolicited telephone calls. In some embodiments, the database might further contain a plurality of subscriber telephone numbers, the plurality of subscriber telephone numbers comprising the destination telephone number. In some instances, the database might correlate a first telephone number that originates unsolicited telephone calls with one or more subscriber telephone numbers associated with subscribers that do not wish to receive telephone calls from the first telephone number that originates unsolicited telephone calls. Method 800 might continue from the process at block 814 to blocks (or optional blocks) 816, 824, 828, 832, 842, 846, and 850, linked by circular markers denoted by "A," "B," "C," "D," "E," "F," and "G," respectively.

At block 816 (of FIG. 8B), method 800 might comprise receiving, at the telephone switch, a second call originating from a second originating telephone number and directed to the destination telephone number. Method 800, at block 818, might comprise searching, with the computer system, the database for the second originating telephone number and determining an originating entity of the second originating telephone number, in response to the telephone switch receiving the second call. Method 800 might further comprise determining, at the computer system, whether the originating entity of the second originating telephone number is the same entity as the originating entity that has been added to the database in response to the user input from the user at the destination telephone number (block 820) and prohibiting termination of the second call originated from the second originating telephone number, based on a determination that the originating entity of the second originating telephone number is the same originating entity that has been added to the database in response to the user input from the user at the destination telephone number (block 822).

At block 824 (of FIG. 8C), method 800 might comprise associating, in the database, the originating entity, as a single calling entity, with a plurality of telephone numbers that originate unsolicited telephone calls. Method 800 might further comprise, at block 826, prohibiting termination of one or more telephone calls from one or more telephone numbers associated with the originating entity, the one or more telephone numbers comprising the plurality of telephone numbers that originate unsolicited telephone calls and at least one other telephone number. In other words, the method might prevent the originating entity, which up to this point has been identified as being the source of unwanted or unsolicited telephone calls and/or text messages, from calling or sending more unwanted or unsolicited calls to users (particularly, users whose telephone numbers and/or names or the like have been added to private, local, national, or international "no-call" and/or "no-text" lists), regardless of what telephone number the originating entity uses (whether or not registered to the originating entity, whether or not flagged as a telephone number that is making unwanted or unsolicited telephone calls or text messages, whether or not the telephone number is spoofed (i.e., a fake telephone number or a number that legitimately belongs to or is associated with an innocent third party), whether or not the telephone number is available for user's callerID systems, and/or the like.

At block 828 (of FIG. 8D), method 800 might comprise determining that the destination telephone number is correlated with the originating telephone number in the database (i.e., a telephone number that originates unsolicited telephone calls is indicated in the database as being correlated with one or more subscriber telephone numbers associated with subscribers that do not wish to receive telephone calls from the first telephone number that originates unsolicited telephone calls, or the like). Method 800 might further comprise prohibiting termination of one or more telephone calls originated from the originating telephone number, based on a determination that the destination telephone number is correlated with the originating telephone number in the database (block 830).

At optional block 832 (of FIG. 8E), method 800 might comprise determining that the originating telephone number originates unsolicited telephone calls, by determining that the database contains the originating telephone number. Alternatively, method 800, at block 834, might comprise determining that the originating telephone number originates unsolicited telephone calls, by receiving first input from a subscriber at the destination telephone number, the first input indicating that the first call is an unsolicited telephone call. As above, the first input might include, without limitation, one or more of a hard or physical button depression/input, a soft or virtual button touch input, a numeric button input, a menu selection input (indicating "unwanted call/text message," "unsolicited call/text message," "block call/text message," "reject call/text message," or the like), the asterisk or "*" button, the pound, hash, or "#" button, and/or the like. Method 800 might further comprise, at block 836, adding, with the computer system, the originating telephone number to the database, based on the first input received from the subscriber at the destination telephone number. In some cases, the process of adding, with the computer system, information about the originating entity to a database of telephone numbers that originate unsolicited telephone calls (of block 814) might comprise the process of adding, with the computer system, the originating telephone number to the database, based on the first input received from the subscriber at the destination telephone number (of block 836). In some embodiments, method 800 might further comprise receiving second input from the subscriber at the destination telephone number, the second input indicating that the originating telephone number should no longer be included in the database (block 838) and removing the originating telephone number from the database, based on the second input received from the subscriber at the destination telephone number (block 840) (e.g., if the originating telephone number was spoofed, if the originating entity turns out to be a legitimate company rather than a telemarketer or the like, or if the user has changed his or her mind about receiving communications from the particular telemarketer, and/or the like).

At block 842 (of FIG. 8F), method 800 might comprise determining that the originating telephone number is no longer in use. Method 800, at block 844, might comprise removing the originating telephone number from the database based on determining that the originating telephone number is no longer in use. This might occur on a period basis (e.g., every month, every two months, every three months, every quarter, every six months, every year, every other year, every three years, every five years, every ten years, and/or the like), in response to a request for a new telephone number by any new subscriber (so that the telephone number may be re-assigned or re-used, or the like), and/or the like.

At block 846 (of FIG. 8G), method 800 might comprise maintaining, at a telecommunication service provider, a personal database associated with a subscriber at the destination telephone number, the personal database containing telephone numbers that originate unsolicited telephone calls to the subscriber at the destination telephone number. Method 800 might further comprise, at block 848, providing a web user interface associated with the subscriber at the destination telephone number, said web user interface being configured to allow the subscriber to manage a personalized no-call list, by allowing the subscriber to select originating telephone numbers for adding or removing from the personal database.

At optional block 850 (of FIG. 8H), method 800 might comprise playing, through the telephone switch, an audible warning to the originating telephone number on the call, the audible warning indicating that further calls will violate unsolicited calling restrictions. In some cases, the audible warning might be sent to the identified originating entity via one or more telephone numbers associated with the originating entity. Alternatively, or additionally, method 800 might comprise determining, at the computer system, that the originating entity associated with the originating telephone number has been warned previously about unsolicited telephone calls (block 852) and imposing a penalty on the originating entity in response to determining that the originating entity has been warned previously and continues to originate unsolicited telephone calls (block 854). In some embodiments, imposing a penalty might comprise informing an authority about the originated unsolicited telephone calls from the originating entity (block 856). Alternatively, or additionally, imposing a penalty comprises generating a call detail record to bill one or more of the unsolicited telephone calls to the originating entity (block 858).

According to some embodiments, a service might be added that allows a user to determine on a call-by-call basis how a particular incoming call will be handled. For instance, when a new call is received, the receiving party also receives a notification indicating who is calling and possibly also why that person is calling. When the originating party calls, the service provider determines whether this originator or originating entity has ever called the receiving party at the destination telephone number (or has ever called the receiving party at all). If not, the service provider might send a request, via one or more of text message, voice message, e-mail, image, etc., to the originator or originating entity for the originating entity to self-identify and to provide a purpose for the call. If the originating device is a smart phone or computer, a text or graphical message and response mechanism (e.g., soft-button response, drop-down list, reply text message, or the like) can be used. If a voice-only phone, an audio mechanism (e.g., automated or auto attendant mechanism, or the like) can be used. Treatment of the call is based on the signaling and/or call detail record information associated with the call so as to avoid being spoofed by a change in the CallerID.

At the destination telephone, the call request is received. Before actually answering the call, the receiving party can determine how calls (i.e., the current call and future calls) from the originator or originating entity will be handled. In this way, a personalized no-call list can be built and tailored specifically for each person. Possible actions could include, without limitation, blocking the originator or originating entity, saving the request for future disposition, sending an automated response back, only accepting calls from this originator or originating entity during specific times of the day/days of the week, reporting the call to the authorities, and/or the like. These options might be presented to the receiving party as a list in a graphical user interface, a drop-down list, or the like for smart phones, as a voice option for voice-only phones, as a text message prompt (e.g., with numerical response prompts or the like), and/or the like.

In various embodiments, a CallerID field of the first call in method 800 is spoofed or unavailable. Despite this, the method still allows for proper identification of the originating entity, as well as prohibiting (i.e., blocking or preventing) termination of calls from the originating entity (regardless of what actual telephone number or numbers the originating entity uses, whether such telephone numbers are registered by the originating entity or spoofed by the originating entity. In other words, the various embodiments provide a mechanism that does not depend on the CallerID (which could be spoofed or might be unavailable) in order to identify the offending party of an unsolicited call or text message (i.e., originating entity), and provides a mechanism to block the unsolicited call or text message. In some cases, as described above, penalties (including, but not limited to, informing an authority about the originated unsolicited telephone calls from the originating entity and/or generating a call detail record to bill one or more of the unsolicited telephone calls to the originating entity, or the like) might be imposed against the originating entity for violating "no-call" or "no-text" lists on which the destination telephone number (and/or the user(s) associated with the destination telephone number) might be listed.

Figure 9:
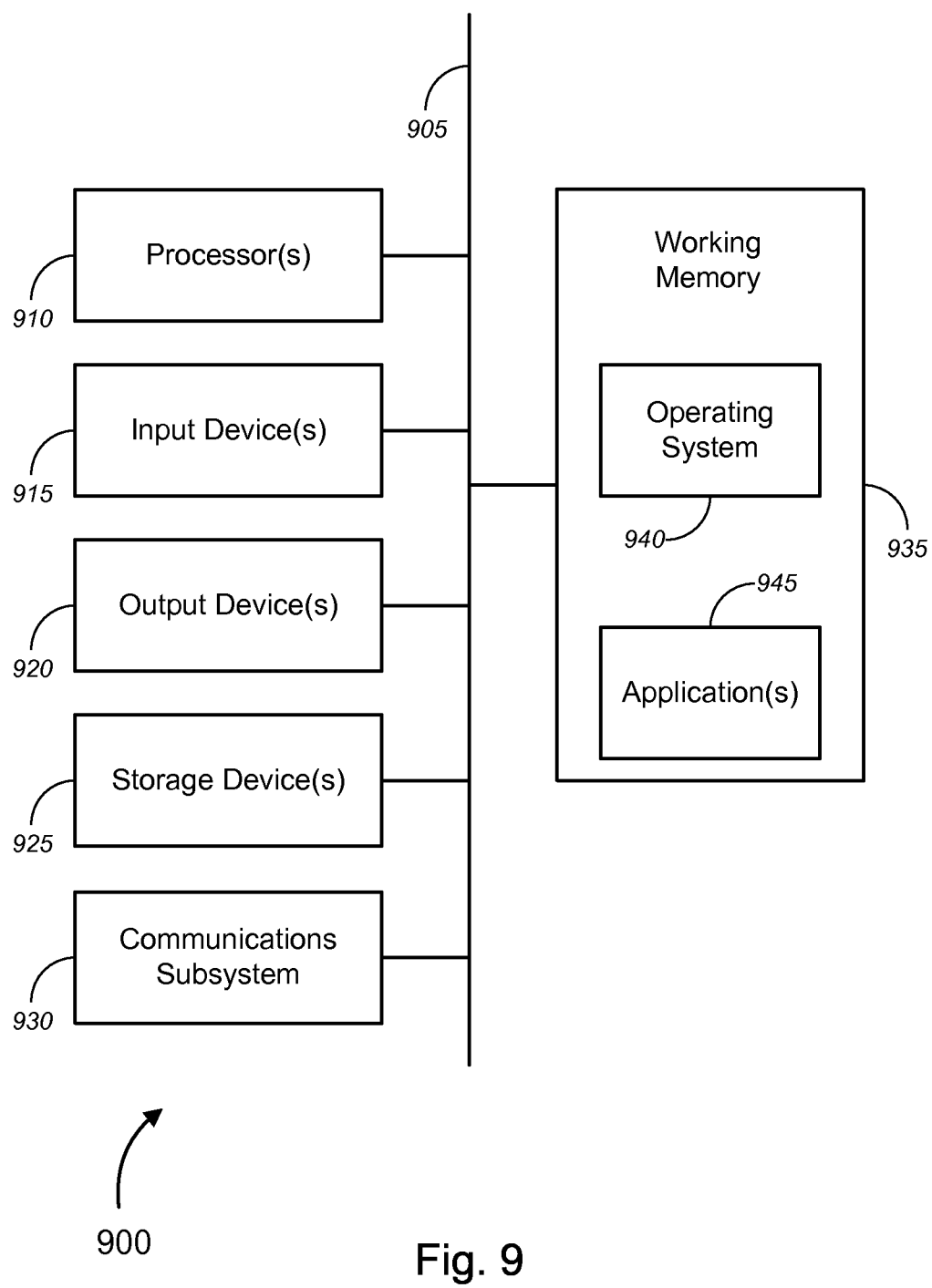
FIG. 9 is a block diagram illustrating an exemplary computer architecture, in accordance with various embodiments.

FIG. 9 is a block diagram illustrating an exemplary computer architecture, in accordance with various embodiments. FIG. 9 provides a schematic illustration of one embodiment of a computer or hardware system 900 that can perform the methods provided by various other embodiments, as described herein, and/or can perform the functions of computer system 125, computer 145, and/or other computer systems as described above. It should be noted that FIG. 9 is meant only to provide a generalized illustration of various components, of which one or more (or none) of each may be utilized as appropriate. FIG. 9, therefore, broadly illustrates how individual system elements may be implemented in a relatively separated or relatively more integrated manner.

The computer or hardware system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer, and/or the like.

The computer or hardware system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer or hardware system 900 might also include a communications subsystem 930, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 930 may permit data to be exchanged with a network (such as the network described below, to name one example), with other computer systems, and/or with any other devices described herein. In many embodiments, the computer or hardware system 900 will further comprise a working memory 935, which can include a RAM or ROM device, as described above.

The computer or hardware system 900 also may comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 925 described above. In some cases, the storage medium might be incorporated within a computer system, such as the system 900. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 900 and/or might take the form of source and/or installable code, which, upon compilation and/or installation on the computer or hardware system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 900) to perform methods in accordance with various embodiments of the invention. According to a set of embodiments, some or all of the procedures of such methods are performed by the computer or hardware system 900 in response to processor 910 executing one or more sequences of one or more instructions (which might be incorporated into the operating system 940 and/or other code, such as an application program 945) contained in the working memory 935. Such instructions may be read into the working memory 935 from another computer readable medium, such as one or more of the storage device(s) 925. Merely by way of example, execution of the sequences of instructions contained in the working memory 935 might cause the processor(s) 910 to perform one or more procedures of the methods described herein.

The terms "machine readable medium" and "computer readable medium," as used herein, refer to any medium that participates in providing data that causes a machine to operation in a specific fashion. In an embodiment implemented using the computer or hardware system 900, various computer readable media might be involved in providing instructions/code to processor(s) 910 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 925. Volatile media includes, without limitation, dynamic memory, such as the working memory 935. In some alternative embodiments, a computer readable medium may take the form of transmission media, which includes, without limitation, coaxial cables, copper wire and fiber optics, including the wires that comprise the bus 905, as well as the various components of the communication subsystem 930 (and/or the media by which the communications subsystem 930 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 900. These signals, which might be in the form of electromagnetic signals, acoustic signals, optical signals, and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of deterring unsolicited telephone calls, the method comprising:
    in response to user input received by a telephone switch from a telephone at a destination telephone number during a first call from an originating telephone number and terminated to the destination telephone number by the telephone switch, capturing, with a computer system, call processing data associated with the first call;
    identifying, with the computer system and based at least in part on the call processing data, an originating entity of the first call;
    adding, with the computer system, information about the originating entity to a database of telephone numbers that originate unsolicited telephone calls;
    receiving, at the telephone switch, a second call originating from a second originating telephone number and directed to the destination telephone number;
    searching, with the computer system, the database for the second originating telephone number and determining an originating entity of the second originating telephone number, in response to the telephone switch receiving the second call;
    determining, at the computer system, whether the originating entity of the second originating telephone number is the same entity as the originating entity that has been added to the database in response to the user input from the user at the destination telephone number; and
    prohibiting termination of the second call originated from the second originating telephone number, based on a determination that the originating entity of the second originating telephone number is the same originating entity that has been added to the database in response to the user input from the user at the destination telephone number.

2. The method of claim 1, wherein the telephone switch comprises the computer system.

3. The method of claim 1, wherein the telephone switch comprises a class 5 wireline switch.

4. The method of claim 1, wherein the telephone switch comprises a voice over Internet Protocol ("VoIP") softswitch.

5. The method of claim 1, wherein the telephone switch comprises a mobile switching center ("MSC").

6. The method of claim 1, wherein the first call is one of a telemarketing voice call or a telemarketing text message.

7. The method of claim 1, wherein the first call is one of a prank telephone call or a prank text message.

8. The method of claim 1, further comprising associating, in the database, the originating entity, as a single calling entity, with a plurality of telephone numbers that originate unsolicited telephone calls.

9. The method of claim 8, further comprising:
    prohibiting termination of one or more telephone calls from one or more telephone numbers associated with the originating entity, the one or more telephone numbers comprising the plurality of telephone numbers that originate unsolicited telephone calls and at least one other telephone number.

10. The method of claim 1, further comprising:
    determining that the originating telephone number originates unsolicited telephone calls, by determining that the database contains the originating telephone number.

11. The method of claim 1, further comprising:
    determining that the originating telephone number originates unsolicited telephone calls, by receiving first input from a subscriber at the destination telephone number, the first input indicating that the first call is an unsolicited telephone call.

12. The method of claim 11, wherein adding, with the computer system, information about the originating entity to the database comprises adding the originating telephone number to the database, based on the first input received from the subscriber at the destination telephone number.

13. The method of claim 12, further comprising:
receiving second input from the subscriber at the destination telephone number, the second input indicating that the originating telephone number should no longer be included in the database; and
removing the originating telephone number from the database, based on the second input received from the subscriber at the destination telephone number.

14. The method of claim 1, further comprising:
maintaining, at a telecommunication service provider, a personal database associated with a subscriber at the destination telephone number, the personal database containing telephone numbers that originate unsolicited telephone calls to the subscriber at the destination telephone number;
providing a web user interface associated with the subscriber at the destination telephone number, said web user interface being configured to allow the subscriber to manage a personalized no-call list, by allowing the subscriber to select originating telephone numbers for adding or removing from the personal database.

15. The method of claim 1, wherein the database further contains a plurality of subscriber telephone numbers, the plurality of subscriber telephone numbers comprising the destination telephone number.

16. The method of claim 15, wherein the database correlates a first telephone number that originates unsolicited telephone calls with one or more subscriber telephone numbers associated with subscribers that do not wish to receive telephone calls from the first telephone number that originates unsolicited telephone calls.

17. The method of claim 16, further comprising:
determining that the destination telephone number is correlated with the originating telephone number in the database; and
prohibiting termination of one or more telephone calls originated from the originating telephone number, based on a determination that the destination telephone number is correlated with the originating telephone number in the database.

18. The method of claim 1, further comprising:
determining that the originating telephone number is no longer in use; and
removing the originating telephone number from the database based on determining that the originating telephone number is no longer in use.

19. The method of claim 1, further comprising:
playing, through the telephone switch, an audible warning to the originating telephone number on the call, the audible warning indicating that further calls will violate unsolicited calling restrictions.

20. The method of claim 1, further comprising:
determining, at the computer system, that the originating entity associated with the originating telephone number has been warned previously about unsolicited telephone calls; and imposing a penalty on the originating entity in response to determining that the originating entity has been warned previously and continues to originate unsolicited telephone calls.

21. The method of claim 20, wherein imposing a penalty comprises informing an authority about the originated unsolicited telephone calls from the originating entity.

22. The method of claim 20, wherein imposing a penalty comprises generating a call detail record to bill one or more of the unsolicited telephone calls to the originating entity.

23. The method of claim 1, wherein the call processing data comprises information from a call detail record ("CDR").

24. The method of claim 1, wherein identifying the originating entity of the first call comprises correlating the call processing data with switch data to identify the originating entity.

25. The method of claim 1, wherein the user input comprises one or more DTMF tones received by the telephone switch from the telephone at the destination telephone number during the first call.

26. The method of claim 1, wherein a CallerID field of the first call is spoofed or unavailable.

27. The method of claim 1, wherein the information about the originating entity comprises one or more telephone numbers associated with the originating entity.

28. The method of claim 27, wherein the one or more telephone numbers comprises the originating telephone number.

29. The method of claim 1, further comprising:
maintaining the database of telephone numbers that originate unsolicited telephone calls;
receiving, at the telephone switch, the first call originating from the originating telephone number and directed to the destination telephone number;
terminating the first call to the destination telephone number; and
receiving, at the telephone switch, user input from the user at the destination telephone number.

30. An apparatus, comprising:
a non-transitory computer readable medium having encoded thereon a set of instructions executable by one or more computers to cause the one or more computers to:
in response to user input received by a telephone switch from a telephone at a destination telephone number during a first call from an originating telephone number and terminated to the destination telephone number by the telephone switch, capture call processing data associated with the first call;
identify, based at least in part on the call processing data, an originating entity of the first call;
add information about the originating entity to a database of telephone numbers that originate unsolicited telephone calls;
in response to receiving, at the telephone switch, a second call originating from a second originating telephone number and directed to the destination telephone number, search the database for the second originating telephone number and determine an originating entity of the second originating telephone number;
determine whether the originating entity of the second originating telephone number is the same entity as the originating entity that has been added to the database in response to the user input from the user at the destination telephone number; and prohibit termination of the second call originated from the second originating telephone number, based on a determination that the originating entity of the second originating telephone number is the same originating entity that has been added to the database in response to the user input from the user at the destination telephone number.

31. A system, comprising:

a database of telephone numbers that originate unsolicited telephone calls;

a telephone switch configured to receive a first call originating from an originating telephone number and directed to a destination telephone number, and configured to terminate the first call to the destination telephone number; and a computer system in communication with the database and the telephone switch, the computer system comprising:

one or more processors; and a computer readable medium in communication with the one or more processors, the computer readable medium having encoded thereon a set of instructions executable by the computer system to:

in response to user input received by the telephone switch from a telephone at the destination telephone number during the first call, capture call processing data associated with the first call;

identify, based at least in part on the call processing data, an originating entity of the first call;

add information about the originating entity to the database;

in response to receiving, at the telephone switch, a second call originating from a second originating telephone number and directed to the destination telephone number, search the database for the second originating telephone number and determine an originating entity of the second originating telephone number;

determine whether the originating entity of the second originating telephone number is the same entity as the originating entity that has been added to the database in response to the user input from the user at the destination telephone number; and prohibit termination of the second call originated from the second originating telephone number, based on a determination that the originating entity of the second originating telephone number is the same originating entity that has been added to the database in response to the user input from the user at the destination telephone number.

* * * * *